US012656906B2

(12) United States Patent
Luo et al.

(10) Patent No.: US 12,656,906 B2
(45) Date of Patent: Jun. 16, 2026

(54) TOUCH-CONTROL MODULE, DISPLAY APPARATUS, AND TOUCH-CONTROL DRIVING METHOD

(71) Applicants: Chengdu BOE Optoelectronics Technology Co., Ltd., Chengdu (CN); BOE Technology Group Co., Ltd., Beijing (CN)

(72) Inventors: Hongqiang Luo, Beijing (CN); Song Ju, Beijing (CN); Qing Gong, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/992,606

(22) PCT Filed: May 24, 2024

(86) PCT No.: PCT/CN2024/095334
§ 371 (c)(1),
(2) Date: Jan. 9, 2025

(87) PCT Pub. No.: WO2024/240261
PCT Pub. Date: Nov. 28, 2024

(65) Prior Publication Data
US 2026/0010259 A1     Jan. 8, 2026

(30) Foreign Application Priority Data
May 25, 2023    (CN) .......................... 202310602720.4

(51) Int. Cl.
*G06F 3/041*        (2006.01)
*G06F 3/044*        (2006.01)

(52) U.S. Cl.
CPC ...... *G06F 3/041662* (2019.05); *G06F 3/0412* (2013.01); *G06F 3/04164* (2019.05); *G06F 3/0446* (2019.05); *G06F 2203/04102* (2013.01)

(58) Field of Classification Search
CPC ............ G06F 3/041662; G06F 3/0446; G06F 3/04164; G06F 3/0412; G06F 2203/04102
See application file for complete search history.

(56) References Cited

U.S. PATENT DOCUMENTS 11,307,704 B1 * 4/2022 Pelissier ............. G06F 3/04166
2012/0075231 A1 * 3/2012 Kwahk ............... G06F 3/04883
                                                                                 715/767

(Continued)

FOREIGN PATENT DOCUMENTS

CN          103677476 A          3/2014
CN          104281349 A          1/2015

(Continued)

*Primary Examiner* — Afroza Chowdhury
(74) *Attorney, Agent, or Firm* — WHDA, LLP

(57)          ABSTRACT

Provided are a touch-control module, a display apparatus, and a touch-control driving method. The touch-control module comprises: a touch-control drive module (200), and a plurality of touch-control substrates (100), which are respectively connected to the touch-control drive module (200), wherein different touch-control substrates (100) are used for providing a touch-control function for different display panels (400); the touch-control drive module (200) is configured to perform touch-control switching on the plurality of touch-control substrates (100), the touch-control switching comprising: turning on a connection path with a target touch-control substrate (100), so as to perform touch-control detection on the target touch-control substrate (100), and turning off a connection path with a touch-control substrate (100) other than the target touch-control substrate (100); and (Continued)

the target touch-control substrate (100) is a touch-control substrate (100) that is currently providing the touch-control function.

19 Claims, 17 Drawing Sheets

(56)                     References Cited

U.S. PATENT DOCUMENTS

| | | | |
|---|---|---|---|
| 2016/0034091 A1* | 2/2016 | Cheng ................... | G06F 3/0446 |
| | | | 345/174 |
| 2016/0299619 A1* | 10/2016 | Cheng ................... | G06F 3/0445 |
| 2019/0377443 A1* | 12/2019 | Dong .................... | G06F 3/0443 |
| 2021/0240326 A1* | 8/2021 | Chou .................... | G06F 3/0412 |
| 2022/0083192 A1* | 3/2022 | Kim ...................... | G06F 3/0446 |
| 2024/0004494 A1* | 1/2024 | Bang ................... | G06F 3/04164 |

FOREIGN PATENT DOCUMENTS

| | | |
|---|---|---|
| CN | 106951133 A | 7/2017 |
| CN | 108776553 A | 11/2018 |
| CN | 116841410 A | 10/2023 |

* cited by examiner

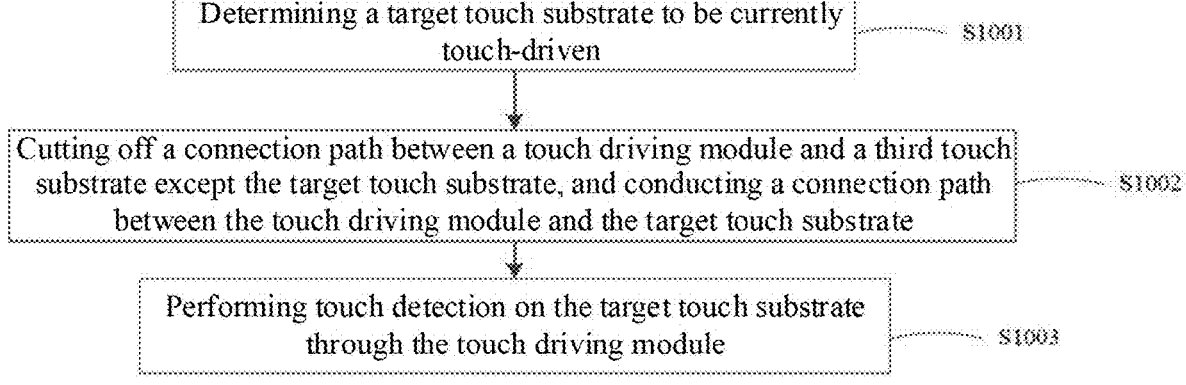

Determining a target touch substrate to be currently touch-driven ........... S1001

Cutting off a connection path between a touch driving module and a third touch substrate except the target touch substrate, and conducting a connection path between the touch driving module and the target touch substrate ........... S1002

Performing touch detection on the target touch substrate through the touch driving module ........... S1003

FIG. 10

Mutual capacitive driving

Tx self-capacitive driving

Rx self-capacitive driving

TOUCH-CONTROL MODULE, DISPLAY APPARATUS, AND TOUCH-CONTROL DRIVING METHOD

CROSS-REFERENCE TO RELATED APPLICATION

This application claims the priority of the Chinese Patent application filed on May 25, 2023 before the CNIPA, China National Intellectual Property Administration with the application number of 202310602720.4, and the title of "TOUCH-CONTROL MODULE, DISPLAY APPARATUS, AND TOUCH-CONTROL DRIVING METHOD", which is incorporated herein in its entirety by reference.

FIELD

The present disclosure relates to the technical field of display, and particularly to a touch module, a display device, and a touch driving method.

BACKGROUND

With the continuous development of display technology, touch display devices have been widely used. The touch display device includes a touch panel and a display panel, and the touch panel is configured to provide a touch function for the display panel. A plurality of display panels are integrated in some display devices, and a touch panel needs to be configured for each display panel to provide a touch function for each display panel individually. In the related art, for a display device integrated with a plurality of display panels, a corresponding touch integrated circuit (TIC) needs to be configured for each touch panel.

SUMMARY

In view of the above-mentioned problems, embodiments of the present disclosure provide a touch module, a display device, and a touch driving method.

The present disclosure provides a touch module, including:

a touch driving module and a plurality of touch substrates connected to the touch driving module, wherein different touch substrates are configured to provide touch functions for different display panels;

the touch driving module is configured to perform touch switching among the plurality of touch substrates, and the touch switching includes: conducting a connection path between the touch driving module and a target touch substrate to perform touch detection on the target touch substrate, and turning off connection paths among the touch driving module and other touch substrates except the target touch substrate, wherein the target touch substrate is a touch substrate currently providing the touch function.

Optionally, each touch substrate comprises a plurality of touch signal lines, and the touch driving module comprises a touch integrated circuit (TIC) and a plurality of integrated units connected to the TIC; each integrated unit is configured to integrate touch signal lines from the plurality of touch substrates, wherein each integrated unit comprises a plurality of signal transmission circuits connected in parallel, and each signal transmission circuit is connected to a touch signal line on one of the plurality of touch substrates for transmitting a signal outputted by the TIC to the touch signal line and transmitting a signal inputted via the touch signal line to the TIC.

Optionally, the plurality of touch signal lines on each touch substrate comprise touch driving lines extending along a first direction and touch sensing lines extending along a second direction, and the first direction intersects the second direction, wherein each integrated unit comprises a first integrated unit and a second integrated unit;

the first integrated unit is configured to integrate a plurality of touch driving lines from different touch substrates, and the second integrated unit is configured to integrate a plurality of touch sensing lines from different touch substrates, wherein the first integrated unit comprises a plurality of drive circuits connected in parallel, and each drive circuit is configured to transmit a drive signal outputted by the TIC to a touch driving line on one of the plurality of touch substrates; and the second integrated unit comprises a plurality of sensing circuits connected in parallel, and each sensing circuit is configured to transmit a sensing signal on a touch sensing line on one of the plurality of touch substrates to the TIC.

Optionally, each sensing circuit comprises: a first switch, a second switch, and a third switch, wherein each touch sensing line is connected to a first terminal of the first switch, a first terminal of the second switch, and a first terminal of the third switch; and a second terminal of the first switch is grounded, and second terminals of the second switch and the third switch are connected to the TIC; the second switch is configured to receive a positive voltage outputted by the TIC, and the third switch is configured to input the sensing signal on the touch sensing line to the TIC.

Optionally, each drive circuit comprises: a fourth switch, a fifth switch, a sixth switch, and a seventh switch, wherein each touch driving line is connected to a first terminal of the fourth switch, a first terminal of the fifth switch, a first terminal of the sixth switch, and a first terminal of the seventh switch;

second terminals of the fourth switch and the fifth switch are connected to a power signal terminal of the TIC, a second terminal of the sixth switch is grounded, and a second terminal of the seventh switch is connected to a drive signal output terminal of the TIC, wherein the fourth switch is configured to receive a positive voltage outputted by the power signal terminal, the fifth switch is configured to receive a negative voltage outputted by the power signal terminal, and the drive signal output terminal is configured to output the drive signal.

Optionally, each drive circuit further comprises an anti-static unit; and each touch driving line is connected to the first terminal of the fourth switch, the first terminal of the fifth switch, and the first terminal of the sixth switch, and then is connected to the first terminal of the seventh switch after being connected in series to the anti-static unit.

Optionally, the touch driving module and a first touch substrate are located in a same panel, and the touch module further comprises: a first flexible circuit board;

the first flexible circuit board is configured to connect a plurality of touch signal lines on a second touch substrate to the touch driving module, wherein the first touch substrate is any one of the plurality of touch substrates, and the second touch substrate is a touch substrate except the first touch substrate.

Optionally, the touch driving module comprises a first binding area and a second binding area; each integrated unit is located in the first binding area or the second binding area.

Optionally, the numbers of the plurality of touch signal lines in different touch substrates are the same or different, wherein the number of the plurality of integrated units is greater than or equal to the number of touch signal lines on a first touch substrate, and the first touch substrate is a touch substrate with the largest number of touch signal lines.

The present disclosure further discloses a display device, comprising the touch module and a plurality of display panels corresponding to a plurality of touch substrates in the touch module, respectively, wherein each touch substrate provides a touch function for a corresponding display panel.

Optionally, the display device further comprises a main control module, and the main control module is connected to a touch driving module in the touch module, wherein the main control module is configured to determine a target touch substrate to be switched to, and send a touch switching signal for the target touch substrate to the touch driving module; and the touch driving module is configured to conduct a connection path between the touch driving module and the target touch substrate in response to the touch switching signal to perform touch detection on the target touch substrate.

Optionally, each touch substrate is configured into a corresponding display panel, and the display panel has two different panel states; the panel state is used for characterizing whether a display surface of the display panel faces an observation sight line; and the main control module is configured to detect the panel state of the display panel and determine the target touch substrate based on the panel state.

Optionally, each display panel further comprises a plurality of signal lines, and the plurality of signal lines comprise a signal line connecting a display driving module on the display panel and the main control module, and a signal line connecting the touch driving module and the main control module; the display device further comprises: a second flexible circuit board, wherein the second flexible circuit board is configured to transfer a plurality of signal lines in at least one first display panel to a second display panel; and a plurality of signal lines on the second display panel are connected to the main control module through a switching interface on the second display panel.

Optionally, the touch driving module in the touch module is located in the second display panel, wherein the second flexible circuit board is further configured to transfer a plurality of touch signal lines of a touch substrate corresponding to the at least one first display panel to the second display panel so as to connect the transferred plurality of touch signal lines to the touch driving module.

Optionally, the display panel comprises a display area and a non-display area, and the non-display area comprises a frame area close to at least one side of the display area; the touch driving module and the plurality of signal lines are located in the frame area, wherein a size of the frame area of the second display panel is greater than a size of the frame area of the first display panel.

Optionally, among the plurality of display panels, a third display panel is located on a non-display surface side of a fourth display panel, wherein the fourth display panel is a foldable panel; and the third display panel displays a picture when the fourth display panel is in a folded state, and the fourth display panel displays a picture when the fourth display panel is in an unfolded state.

The present disclosure further disclose a touch driving method, applied to the touch module, or applied to the display device, the method comprising:

determining a target touch substrate to be currently touch-driven;

cutting off a connection path between the touch driving module and a third touch substrate except the target touch substrate, and conducting a connection path between the touch driving module and the target touch substrate; and performing touch detection on the target touch substrate through the touch driving module.

Optionally, the touch detection is periodic touch detection, and the method further comprises:

in a detection gap of performing periodic touch detection on the target touch substrate, performing touch scanning on the third touch substrate through the touch driving module to obtain a reference sensing signal of a touch electrode on the third touch substrate, wherein the reference sensing signal is used for providing a reference signal when touch detection is performed on the third touch substrate.

Optionally, the target touch substrate comprises a plurality of touch driving lines and a plurality of touch sensing lines; the plurality of touch driving lines are connected in series to a plurality of drive electrodes arranged along a first direction, and the plurality of touch sensing lines are connected in series to a plurality of sensing electrodes arranged along a second direction; the first direction intersects the second direction; the performing touch detection on the target touch substrate through the touch driving module comprises:

in a first time period, performing mutual capacitive touch detection on the target touch substrate;

in a second time period, performing self-capacitive touch detection on the target touch substrate; and acquiring a touch signal based on the mutual capacitive touch detection and the self-capacitive touch detection, wherein the first time period and the second time period do not overlap.

Optionally, wherein the in a second time period, performing self-capacitive touch detection on the target touch substrate comprises:

in a first sub-time period of the second time period, providing drive signals to the plurality of touch driving lines in the target touch substrate, and acquiring a touch position on the target touch substrate based on sensing signals fed back by the plurality of touch driving lines; and/or in a second sub-time period of the second time period, providing drive signals to the plurality of touch sensing lines in the target touch substrate, and acquiring the touch position on the target touch substrate based on sensing signals fed back by the plurality of touch sensing lines, wherein the first sub-time period is different from the second sub-time period.

The touch module provided in the present disclosure includes the touch driving module and the plurality of touch substrates, and the touch driving module is connected to the plurality of touch substrates. The touch driving module is configured to perform touch switching among the plurality of touch substrates, and the touch switching includes: conducting the connection path between the touch driving module and the target touch substrate to perform touch detection on the target touch substrate, and turning off the connection paths among the touch driving module and other touch substrates except the target touch substrate. The target touch substrate is a touch substrate to be provided with a touch function.

The above description is merely an overview of the technical solution disclosed in this document. To gain a clearer understanding of the technical solutions disclosed herein, one can implement it according to the content of the specification. Furthermore, to make the aforementioned and other objectives, features, and advantages of this disclosure more apparent and comprehensible, specific embodiments of the disclosure are particularly exemplified below.

BRIEF DESCRIPTION OF THE DRAWINGS

To more clearly illustrate the technical solution of the embodiment disclosed herein, a brief introduction will now be given to the drawings that will be used in the description of this embodiment. It is evident that the drawings described below are merely some embodiments of the disclosure, and for skilled persons in the art, without the need for creative labor, additional drawings can be obtained based on these figures.

FIG. 10 is a flowchart of the steps of a touch driving method in an embodiment of the present disclosure;

6

Figure 5A:
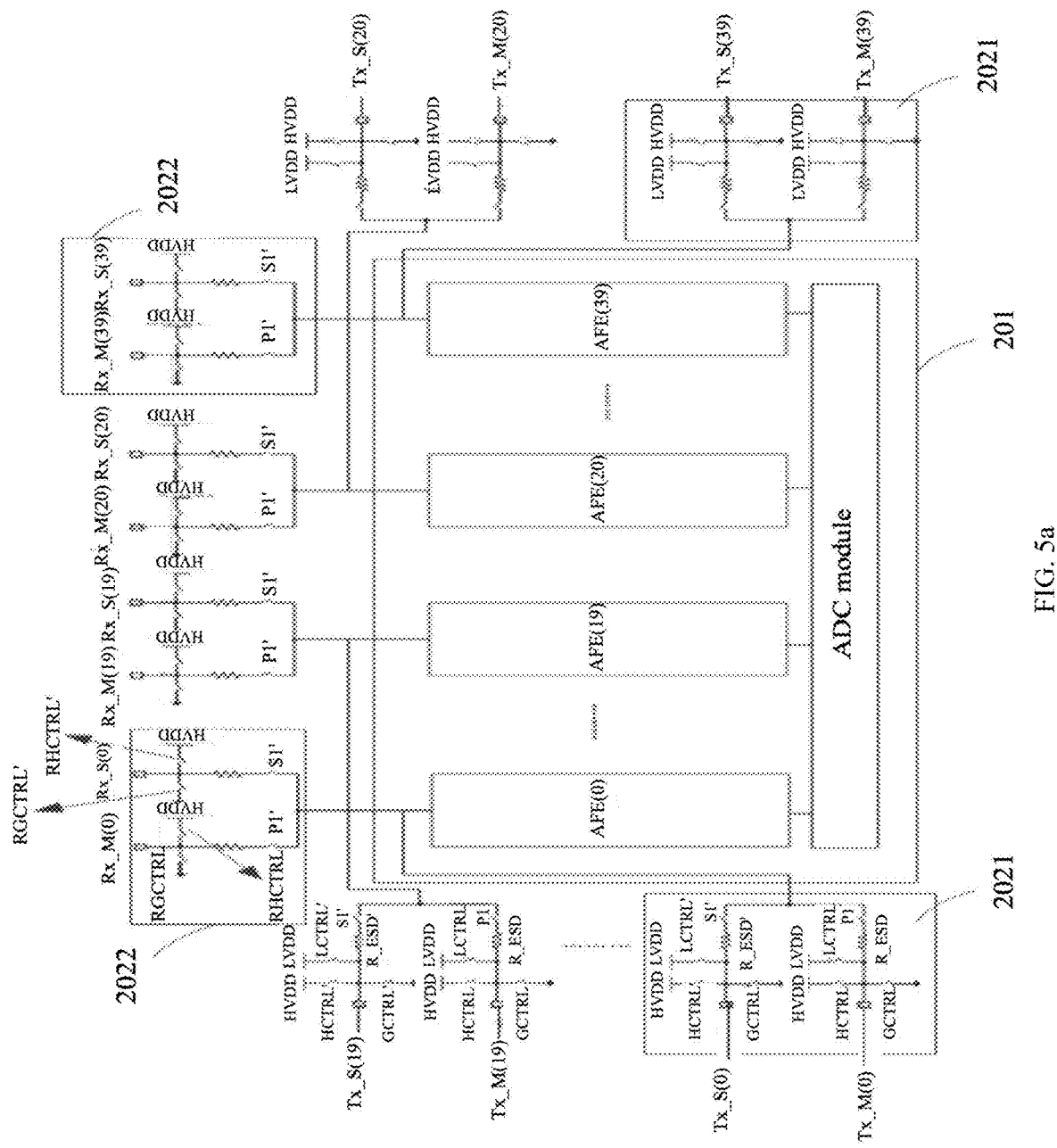
FIG. 5*a* is a schematic diagram of detailed structures of first integrated units, second integrated units, and a TIC in the third touch module shown in FIG. 4.
Figure 13A:
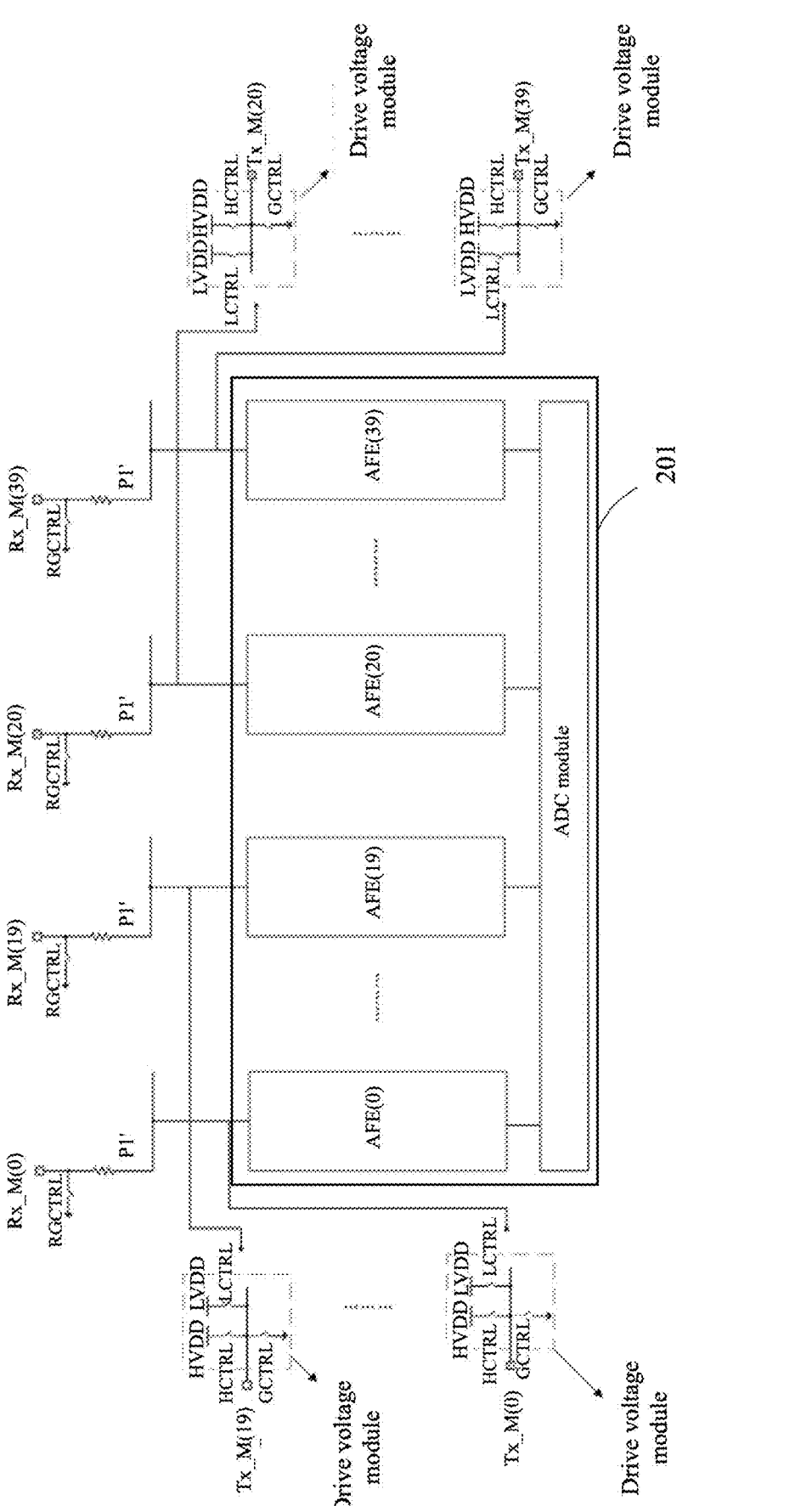
Figure 13B:
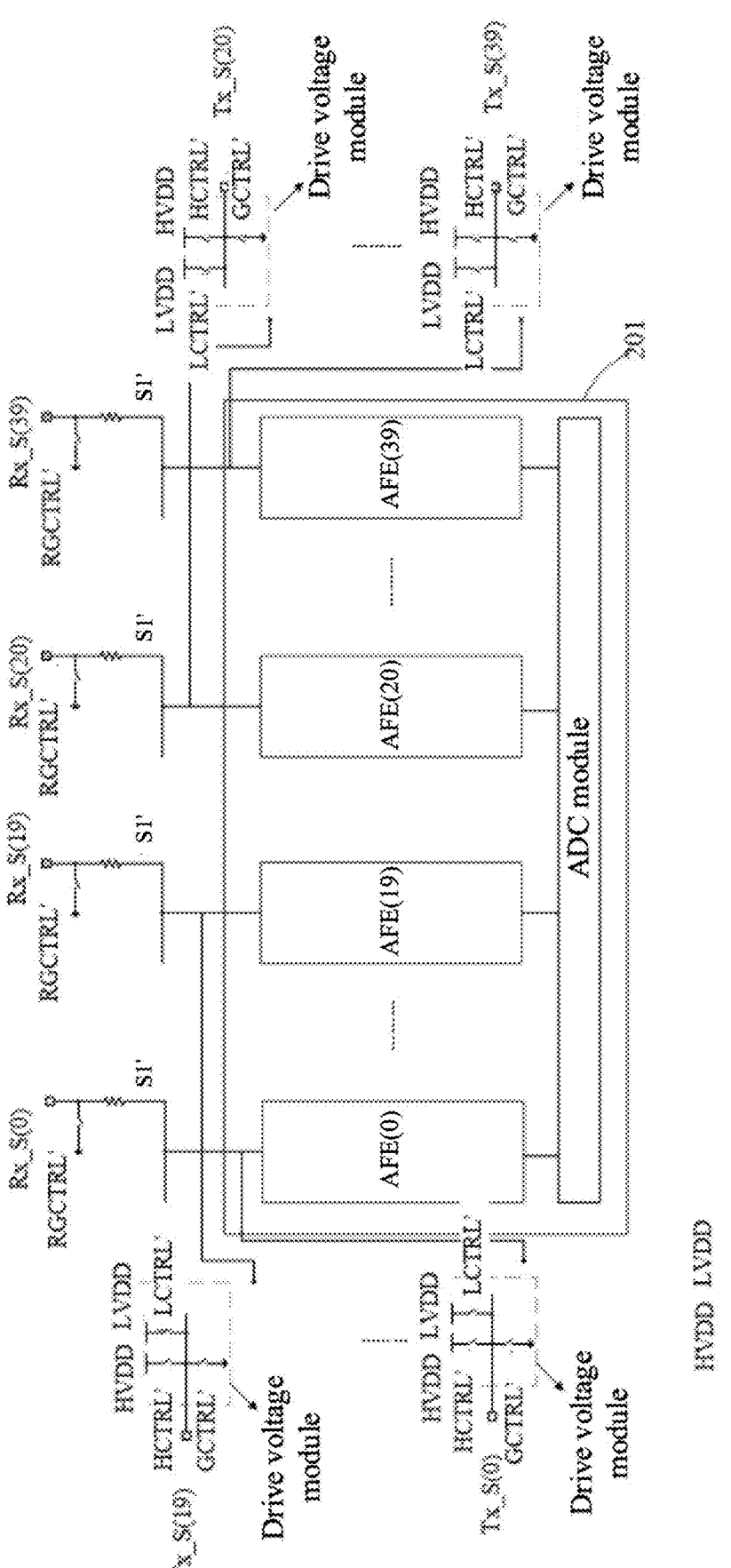

FIGS. 13*a*-13*b* are schematic diagrams of drive circuits for performing mutual capacitive touch detection on the touch module shown in FIG. 5*a;*

Figure 14A:
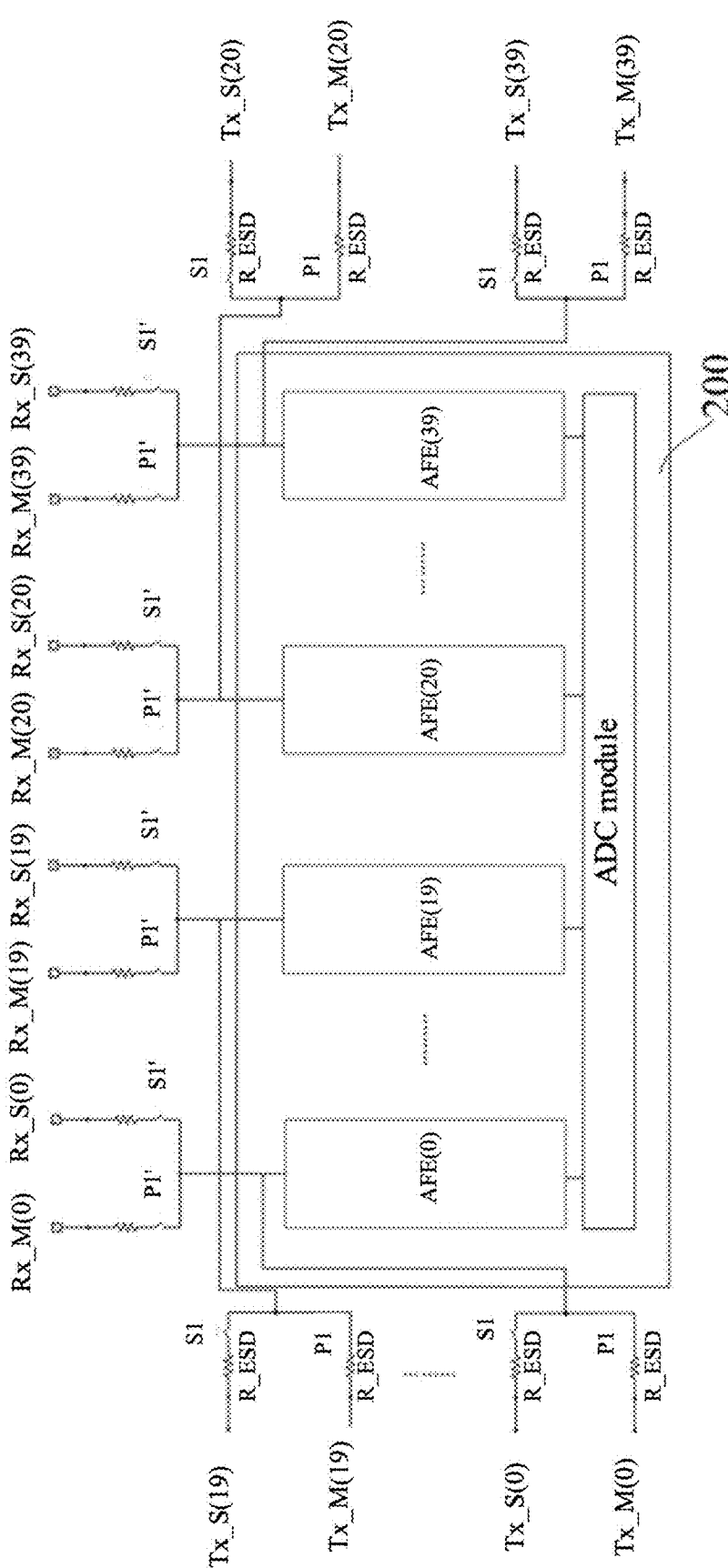
Figure 14B:
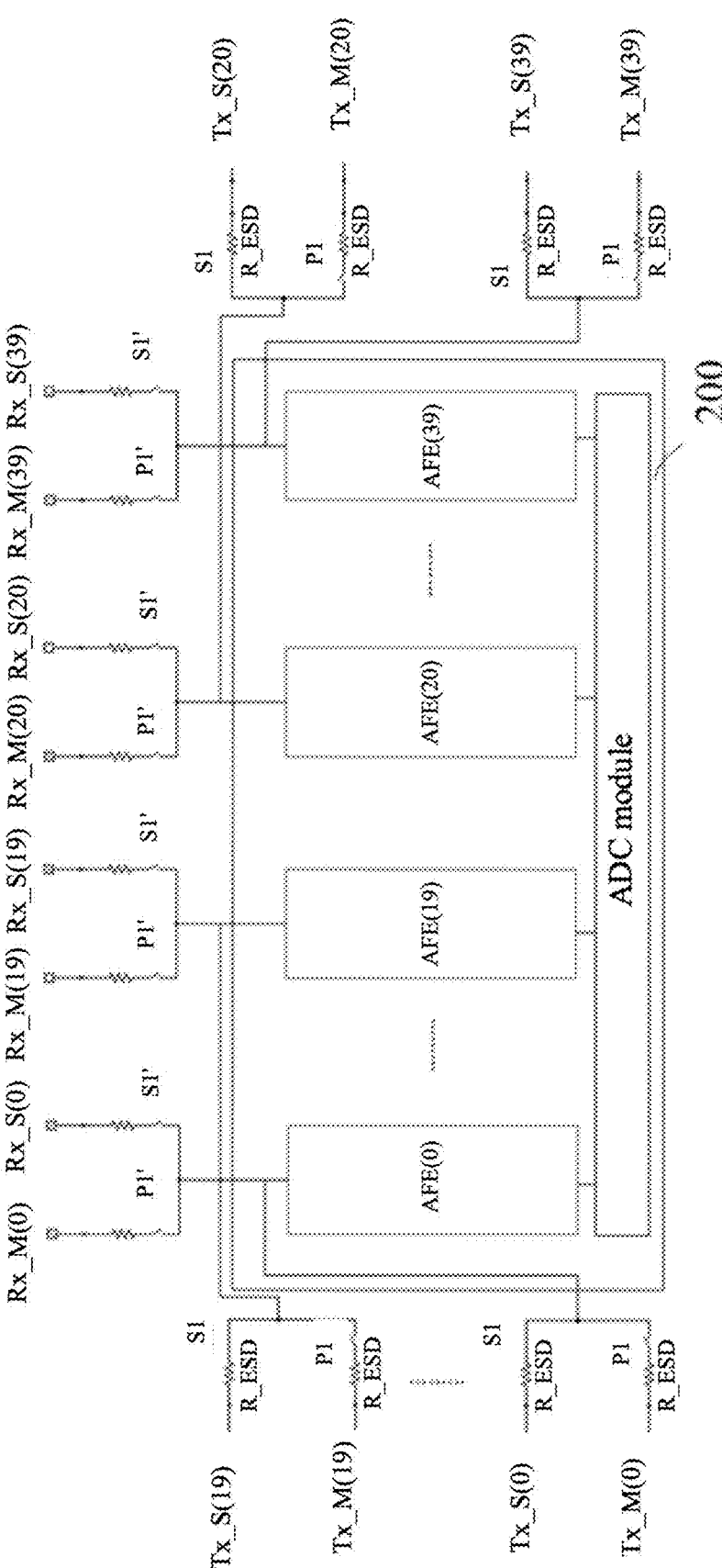
Figure 15A:
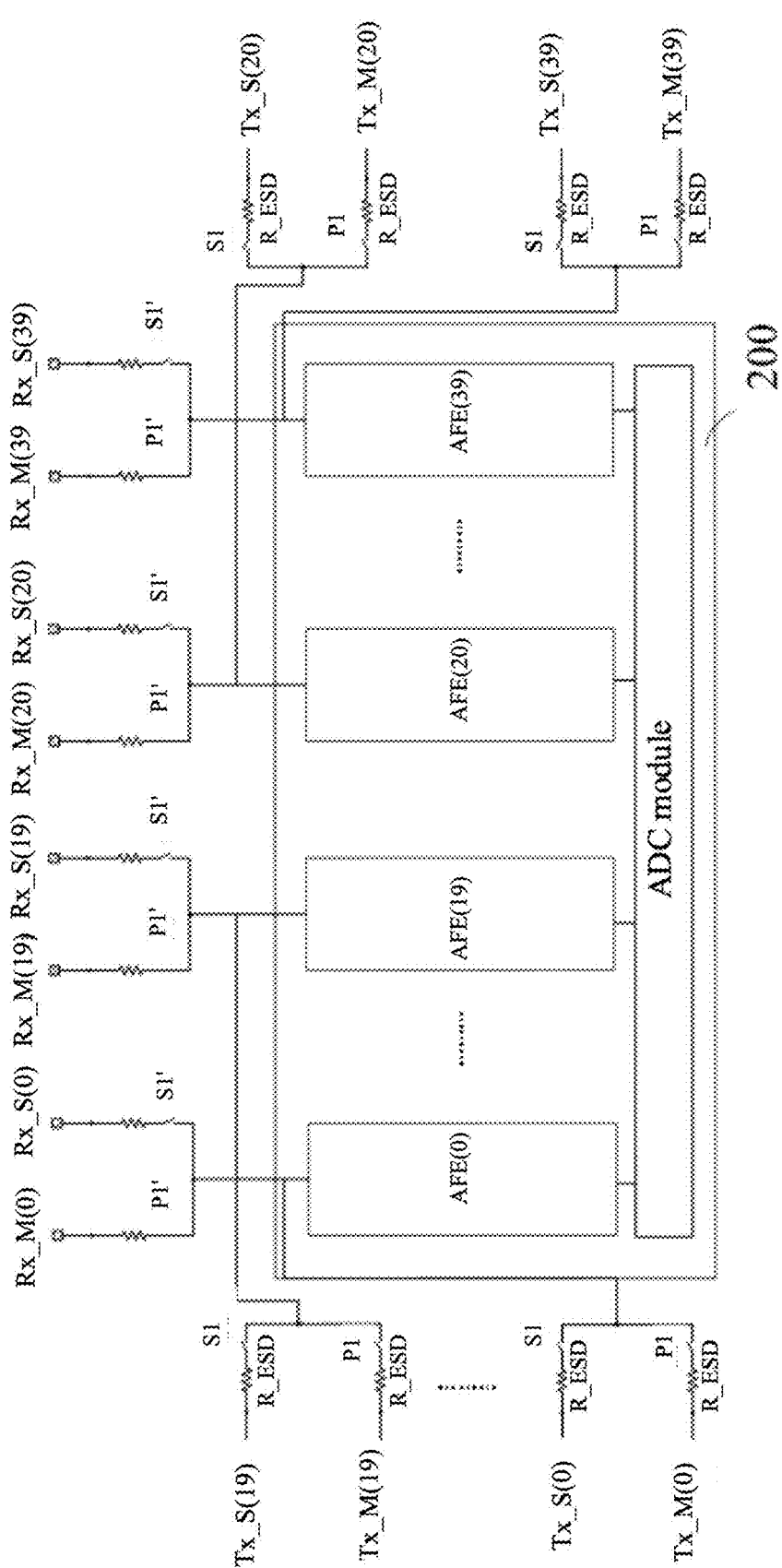
Figure 15B:
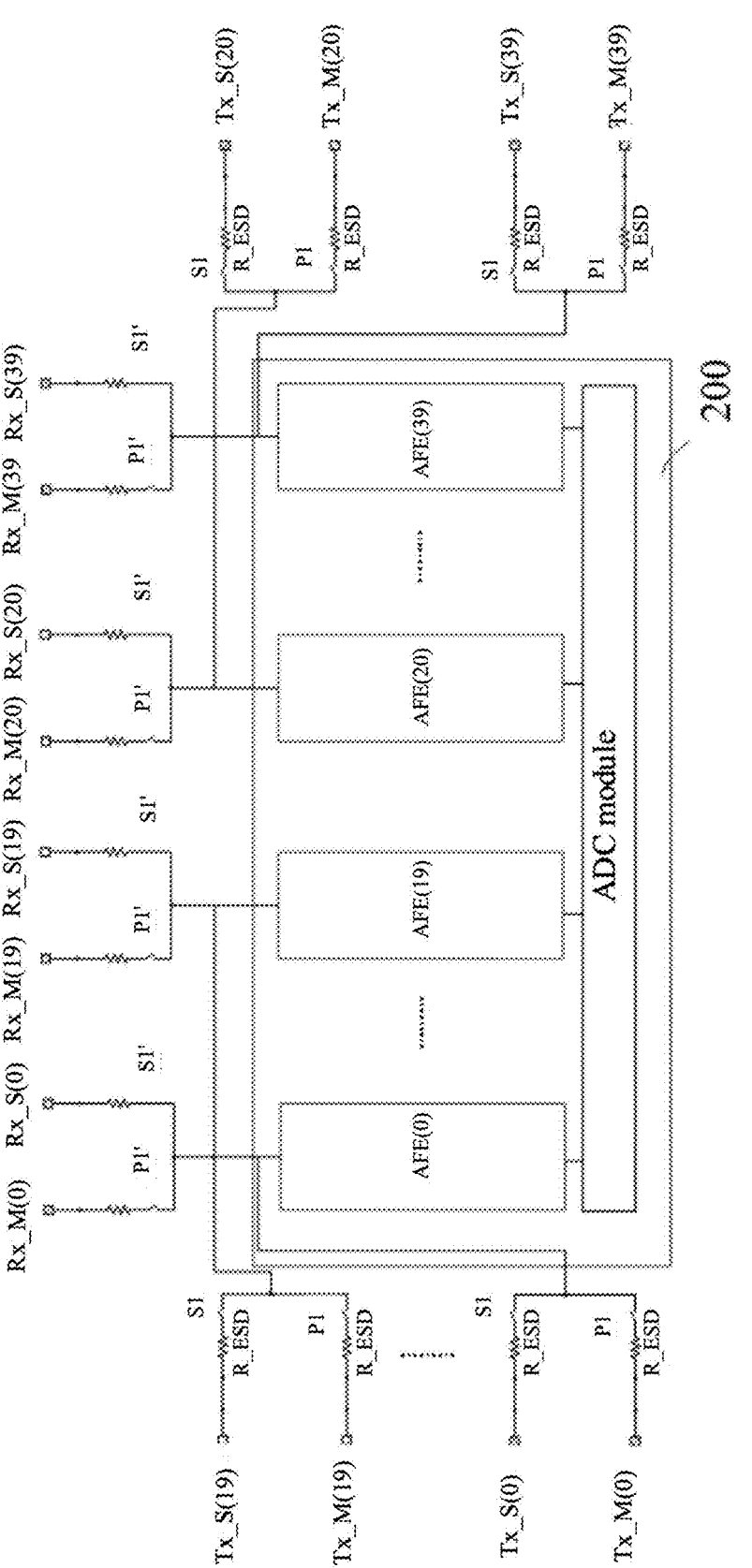

FIGS. 14*a*-14*b* are schematic diagrams of drive circuits for performing drive electrode-based self-capacitive touch detection on the touch module shown in FIG. 5*a*; and FIGS. 15*a*-15*b* are schematic diagrams of drive circuits for performing sensing electrode-based self-capacitive touch detection on the touch module shown in FIG. 5*a*.

DETAILED DESCRIPTION

To make the aforementioned objectives, features, and advantages of this disclosure more apparent and comprehensible, a clear and complete description of the technical solutions in the embodiment of the disclosure will be provided below in conjunction with the drawings in the embodiment. It is evident that the described embodiment is only a part of the embodiments of this disclosure, not all of them. Based on the embodiment in this disclosure, all other embodiments obtained by ordinary technicians in the field without making creative efforts are within the scope of protection of this disclosure.

In the related art, a plurality of display panels are integrated in some display devices. Taking a foldable mobile phone as an example, this mobile phone generally includes a main screen and a secondary screen, and both the main screen and the secondary screen need to be displayed and touched normally. Therefore, both the main screen and the secondary screen have their own display integrated circuits (DICs) and TICs. Thus, there are two problems as follows.

In a first aspect, a foldable mobile phone needs to use two DICs, two TICs, and twice the number of capacitive and resistive components. If components such as capacitor and resistor, transient voltage suppressor (TVS), and crystal oscillator need to be configured for each TIC, the manufacturing cost and power consumption are high, resulting in a high selling price of the sold foldable mobile phone and affecting the market occupancy rate.

In a second aspect, the foldable mobile phone generally requires a main screen and a secondary screen to support active pen functions. However, since the main screen and the secondary screen are two different TICs, which may come from different manufacturers, they may not be synchronized in terms of signal-to-noise ratio, linearity, accuracy, jitter, and other performance aspects. This results in significant difficulties in debugging the active pen functions of the main screen and the secondary screen, and the active pen function of one display screen often needs to be disabled.

In view of this, the present disclosure provides a touch module, which may be applied to a display device which needs to be integrated with a plurality of display panels. Specifically, the touch module includes a plurality of touch substrates, and the plurality of touch substrates share one touch driving module. The touch driving module may perform touch detection on a touch substrate which needs to provide a touch function by performing touch switching among the plurality of touch substrates. Thus, only one TIC is required for the plurality of touch substrates. Since only one TIC is required, the following effects may be achieved.

Firstly, only one set of capacitive and resistive components needs to be configured for the touch driving module so that the manufacturing cost and power consumption are reduced.

Secondly, since the plurality of touch substrates may share one TIC, the synchronization of the active pen functions and performances configured by the plurality of touch substrates in the touch module may be ensured so that the plurality of touch substrates may maintain the active pen functions.

Figure 1:
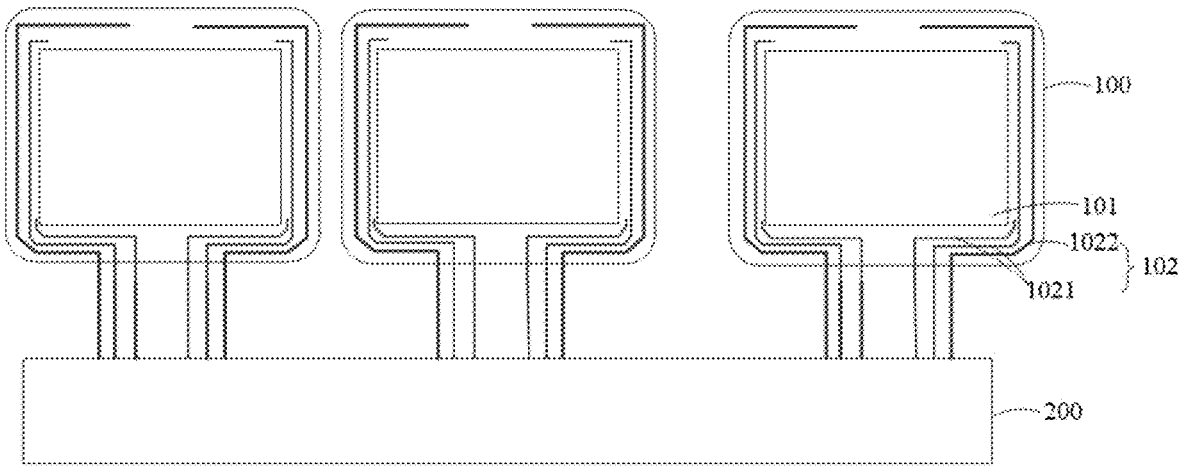
FIG. 1 is a schematic diagram of an overall structure of a first touch module in an embodiment of the present disclosure.

Referring to FIG. 1, it is a schematic diagram of an overall structure of a touch module in an embodiment of the present disclosure. A touch module of the present disclosure is described in conjunction with FIG. 1. As shown in FIG. 1, the touch module includes a touch driving module 200 and a plurality of touch substrates 100.

Different touch substrates 100 provide touch functions for different display panels 400.

The touch driving module 200 is connected to the plurality of touch substrates 100.

The touch driving module 200 is configured to perform touch switching among the plurality of touch substrates 100, and the touch switching includes: conducting a connection path between the touch driving module 200 and a target touch substrate 100 to perform touch detection on the target touch substrate 100, and turning off connection paths among the touch driving module 200 and other touch substrates 100 except the target touch substrate 100.

The target touch substrate 100 is a touch substrate 100 to be provided with a touch function.

In this embodiment, the touch substrate 100 may be a self-capacitive touch substrate 100 or a mutual capacitive touch substrate 100. For the plurality of touch substrates 100, the plurality of touch substrates 100 may all be the self-capacitive touch substrates 100 or all be the mutual capacitive touch substrates 100, or the plurality of touch substrates 100 may include the self-capacitive touch substrates 100 and the mutual capacitive touch substrates 100. For example, a touch substrate 1001 is the self-capacitive touch substrate 100, and a touch substrate 1002 is the mutual capacitive touch substrate 100. In either case, the touch driving module 200 may be connected to the plurality of touch substrates 100 and realize switching among the plurality of touch substrates 100.

Sizes of the plurality of touch substrates 100 may be different. That is, different touch substrates 100 may provide touch functions for display panels 400 with different sizes. Of course, in some embodiments, the sizes of the plurality of touch substrates 100 may also be the same.

Whether the touch substrate 100 is the self-capacitive touch substrate 100 or the mutual capacitive touch substrate 100, a touch region and an edge region surrounding the touch region are provided. The touch region is arranged with touch electrodes 106. The touch electrode 106 is connected to a touch signal line 102, and touch signals may converge at one side of the edge region after routing in the edge region. The touch signal line 102 is configured to realize signal transmission between the touch electrode 106 on the touch substrate 100 and the touch driving module 200. The connection path between the touch driving module 200 and the touch substrate 100 may refer to the connection among the touch driving module 200 and touch signal lines 102 on the plurality of touch substrate 100.

Specifically, since the plurality of touch substrates 100 share the same touch driving module 200, in some optical implementations, the touch signal lines 102 of the plurality of touch substrates 100 may be integrated into the touch driving module 200 after passing through a multiplexer (MUX). The MUX is an electronic circuit and may perform switching among multiplex signals. In this case, the touch driving module 200 may reuse the existing TIC 201. For the hardware, it is only necessary to add a MUX between the TIC 201 and the touch signal line 102 of the touch substrate 100. Thus, through the internal switching logic of the TIC 201 and the MUX, a connection path between the TIC 201 and a target touch substrate 100 may be conducted, a signal outputted by the TIC 201 may be transmitted to the target touch substrate 100, and a signal fed back by the target touch substrate 100 may be received so that touch detection is realized, and the cost may be further reduced.

The touch driving module 200 may perform touch switching among the plurality of touch substrates 100. In one touch switching, the touch driving module 200 may conduct the connection path between the touch driving module 200 and the target touch substrate 100. In this case, the touch driving module 200 may input a drive signal to the touch signal line 102 on the target touch substrate 100, receive a sensing signal transmitted back by the touch signal line 102 on the target touch substrate 100, and acquire a touch position on the target touch substrate 100 based on the sensing signal, so as to realize touch detection on the target touch substrate 100.

Of course, since the touch driving module 200 needs to perform touch detection on the plurality of touch substrates 100 in a one-to-many manner, when touch detection is performed on the target touch substrate 100, the connection paths among the touch driving module 200 and other touch substrates 100 (hereinafter referred to as other touch substrates 100) except the target touch substrate 100 may be turned off. That is, connection paths among the touch driving module 200 and touch signal lines 102 on other touch substrates 100 are turned off, and neither drive signals can be outputted to the touch signal lines 102 on other touch substrates 100, nor sensing signals transmitted back by the touch signal lines 102 on the touch substrates 100 are received. In this case, other touch substrates 100 may be considered to be in a sleep state, and touch functions are not provided to the corresponding display panels 400.

According to the touch module in this embodiment, when the target touch substrate 100 among the plurality of touch substrates 100 needs to provide a touch function, the touch driving module 200 may conduct the connection path between the touch driving module 200 and the target touch substrate 100 to perform touch detection on the target touch substrate 100 and turn off the connection paths among the touch driving module 200 and other touch substrates 100 except the target touch substrate 100 so that one touch driving module 200 may realize one-to-many touch detection through touch switching. Thus, even if there are a plurality of touch substrates 100, touch detection may be performed through one touch driving module 200, thereby reducing the manufacturing cost.

As described above, the touch substrate 100 generally includes a self-capacitive touch substrate 100 and a mutual capacitive touch substrate 100. Both the self-capacitive touch substrate 100 and the mutual capacitive touch substrate 100 have touch signal lines 102. In an exemplary embodiment, the touch driving module 200 includes: a TIC 201 and a plurality of integrated units 202 connected to the TIC 201.

One integrated unit 202 corresponds to a plurality of touch signal lines 102 from the plurality of touch substrates 100.

The integrated unit 202 includes a plurality of signal transmission circuits connected in parallel, and one signal transmission circuit is connected to one touch signal line 102 on one touch substrate 100 for transmitting a signal outputted by the TIC 201 to the touch signal line 102 and transmitting a signal inputted by the touch signal line 102 to the TIC 201.

Figure 2:
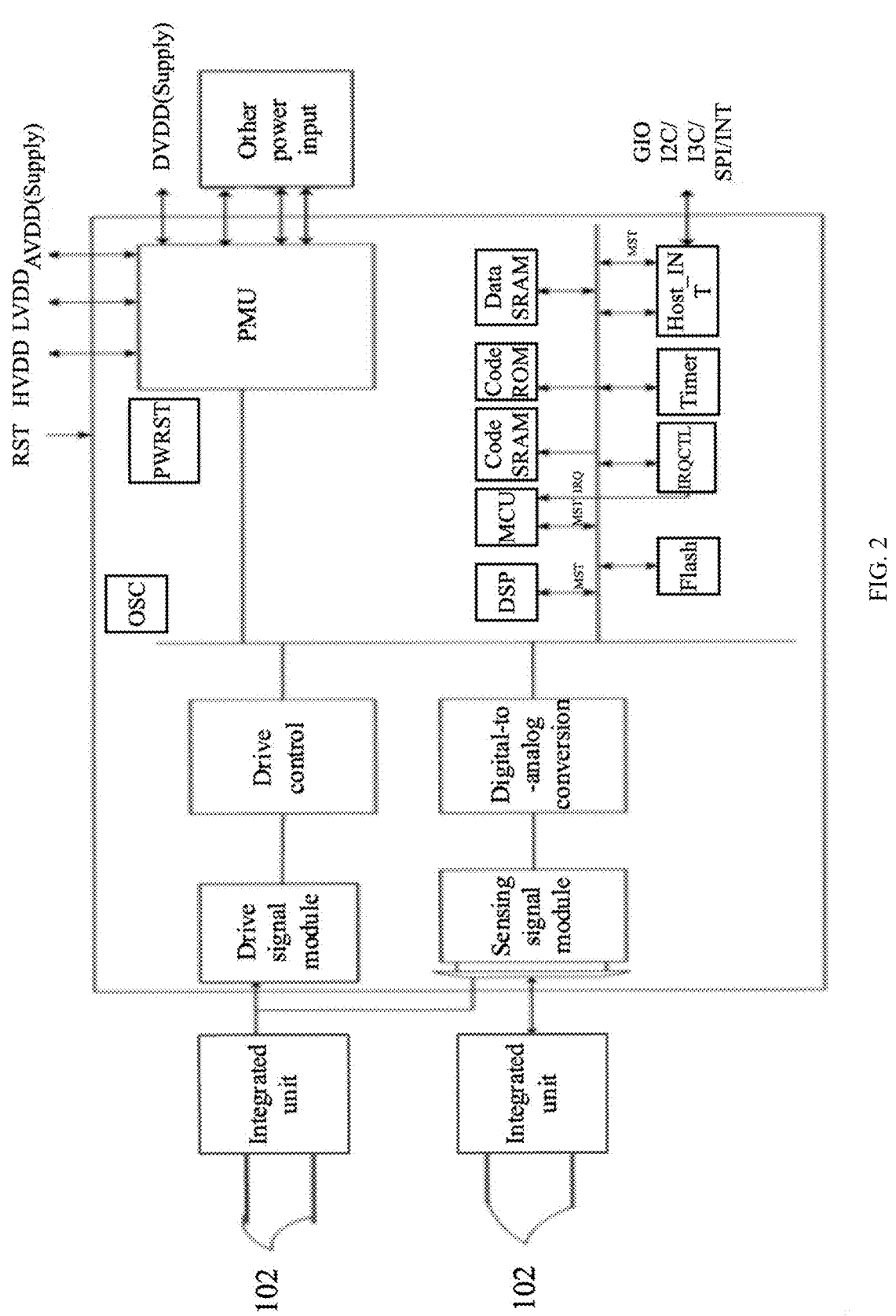
FIG. 2 is a schematic structural diagram of a touch driving module in an embodiment of the present disclosure.

Referring to FIG. 2, it is a schematic structural diagram of a touch driving module 200 in an embodiment of the present disclosure. As shown in FIG. 2, the touch driving module 200 includes a TIC 201 and a plurality of integrated units 202. An internal schematic diagram of the TIC 201 is shown in FIG. 2, a sensing signal module, a drive signal module, a drive control, a analog-to-digital conversion, a power management unit (PMU), etc., are included.

The touch signal line 102 is integrated into the integrated unit 202 and connected to the TIC 201 through the integrated unit 202.

The sensing signal module may be selected as an active front end (AFE). It should be noted that, as shown in FIG. 5a, the number of general sensing signal modules may generally be matched with the number of touch signal lines provided on the touch substrate. For example, the touch substrate C and the touch substrate D each include 40 touch signal lines, and thus the number of sensing signal modules is 40. One sensing signal module corresponds to touch signal lines with the same serial number on a plurality of touch substrates for rectifying sensing signals transmitted by touch sensing lines 1021 and feeding back a voltage signal outputted by the PMU to the touch sensing lines 1021.

The drive signal module is configured to output a drive signal to the touch driving line 1022, and the drive signal is outputted by the drive control.

The PMU is configured to provide a required positive voltage and negative voltage for the integrated unit 202.

DSP, MCU, etc., are used as internal modules of the TIC and configured to determine a touch position according to a sensing signal and transmit a determination result of the touch position to a main control module 500 (in subsequent embodiments) through a signal line 404 such as SPI/INT.

The signal outputted by the TIC 201 may be a drive signal, and the signal inputted by the touch signal line 102 may be a sensing signal. In practice, according to the type of the touch substrate 100, for example, if the touch substrate 100 is the mutual capacitive touch substrate 100, the signal outputted by the TIC 201 may be a drive signal outputted with respect to a drive electrode, and the signal inputted by the touch signal line 102 may be a capacitance signal sensed by a sensing electrode.

The number of integrated units 202 is related to the number of touch signal lines 102 provided on the touch substrate 100, and one touch signal line 102 is considered as one touch channel. Thus, the number of integrated units 202 needs to satisfy the access requirements of the touch signal lines 102 provided on all the touch substrates 100.

The signal transmission circuit may be determined according to the type of the touch substrate 100. Specifically, at least a switch connected to the TIC 201 needs to be provided on the signal transmission circuit to control the conducting and turning off of the connection path between the touch signal line 102 and the TIC 201. Specifically, the TIC 201 may control the conducting and turning off of the switch through an internal timing control circuit.

Figure 3:
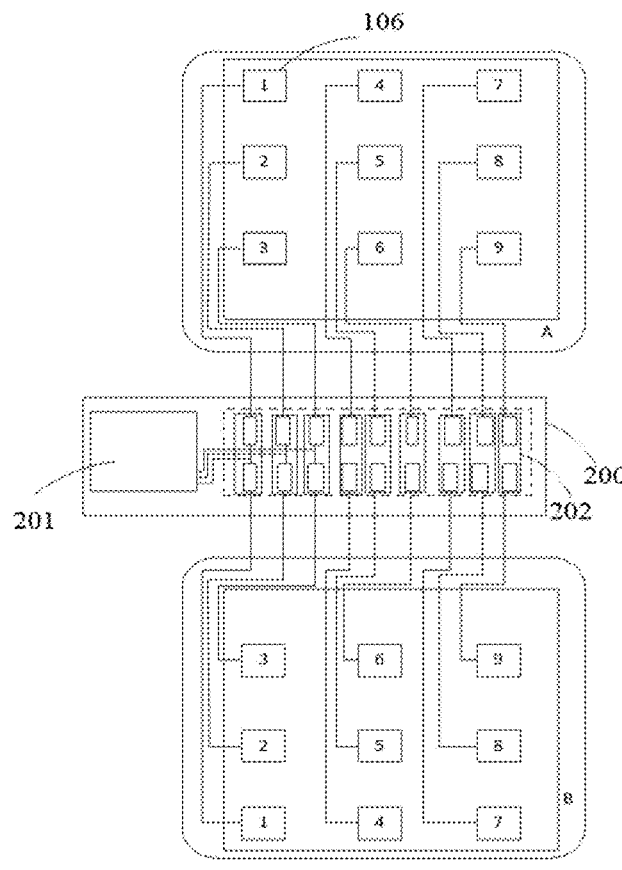
FIG. 3 is a schematic structural diagram of a second touch module in an embodiment of the present disclosure.

In a specific example, a plurality of touch substrates 100 may all be the self-capacitive touch substrates 100, and the self-capacitive touch substrate 100 can include a touch layer. A plurality of grid-shaped touch electrodes 106 are arranged on the touch layer, and each touch electrode 106 is connected to a touch signal line 102. Referring to FIG. 3, it is a schematic structural diagram of a second touch module. As shown in FIG. 3, a touch substrate 100A and a touch substrate 100B are included, and the two touch substrates 100 are both self-capacitive touch substrates 100. The two touch substrates 100 may have the same size and include the same number of touch electrodes 106, assuming that the number is n. The touch electrodes 106 are arranged in an array.

Each integrated unit 202 includes two signal transmission circuits connected in parallel. The signal transmission circuit A is configured to connect to the touch signal line 102 on the touch substrate 100A, and the signal transmission circuit B is configured to connect to the touch signal line 102 on the touch substrate 100B.

The touch driving module 200 includes n integrated units 202, and an i-th integrated unit 202 is configured to correspond to i-th touch signal lines 102 on the two touch substrates 100, i.e., corresponding to i-th touch electrodes 106 on the two touch substrates 100. Specifically, the signal transmission circuit in the i-th integrated unit 202 is configured to transmit a signal outputted by the TIC 201 to the i-th touch signal line 102 on the touch substrate 100 and transmit a signal inputted by the i-th touch signal line 102 on the touch substrate 100A to the TIC 201.

Illustratively, when the touch driving module 200 performs touch detection on the touch substrate 100A, the touch driving module 200 may conduct paths among the TIC 201 and the signal transmission circuits A in all integrated units 202 so that the signal outputted by the TIC 201 may be transmitted to the touch substrate 100A via the signal transmission circuits A. After the touch electrode 106 on the touch substrate 100A receives the signal, a sensing capacitance is formed on the touch electrode 106, and the sensing capacitance will generate a capacitance change due to the touch of a person's finger. This capacitance change is transmitted back to the signal transmission circuit A again by the touch signal line 102 connected to the touch electrode 106. Thus, the TIC 201 may receive a signal transmitted back via the signal transmission circuit A to determine a touch position according to the signal transmitted back, thereby achieving touch detection.

Of course, FIG. 3 described above shows a case where the numbers of touch signal lines 102 of the touch substrates 100 are the same. In some examples, the number of touch signal lines 102 of different touch substrates 100 may be different. In this case, the number of integrated units 202 may be greater than or equal to the number of touch signal lines 102 on a first touch substrate 100, and the first touch substrate 100 is a touch substrate 100 with the largest number of touch signal lines 102.

Thus, the touch driving module 200 may be made to have a more redundant design to meet the touch detection requirements of different sizes of touch substrates 100.

In the case where different touch substrates 100 have different numbers of touch signal lines 102, taking FIG. 3 as an example, assuming that the touch substrate 100A includes n1 touch signal lines 102, and the touch substrate 100B includes n2 touch signal lines 102, n1 being greater than n2, n1 integrated units 202 may be included. Among the n1 integrated units 202, there are n1-n2 integrated units 202 on which the signal transmission circuit A is connected to the touch signal line 102 on the touch substrate 100A, while signal transmission circuit B is not connected to the touch signal line 102.

In a specific example, a plurality of touch substrates 100 may all be the mutual capacitive touch substrates 100. A plurality of touch signal lines 102 on the mutual capacitive touch substrate 100 include touch driving lines 1022 extending along a first direction and touch sensing lines 1021 extending along a second direction, and the first direction intersects the second direction.

The touch substrate 100 may include a touch layer and a sensing layer. The touch layer includes a plurality of drive electrodes arranged along the first direction, and the sensing layer includes a plurality of sensing electrodes arranged along the second direction. The touch driving lines 1022 are connected to the plurality of drive electrodes, and the touch sensing lines 1021 are connected to the plurality of sensing electrodes.

In this example, the integrated unit 202 in the touch driving module 200 may be divided into a first integrated unit 2021 corresponding to the touch driving line 1022 and a second integrated unit 2022 corresponding to the touch sensing line 1021.

Figure 4:
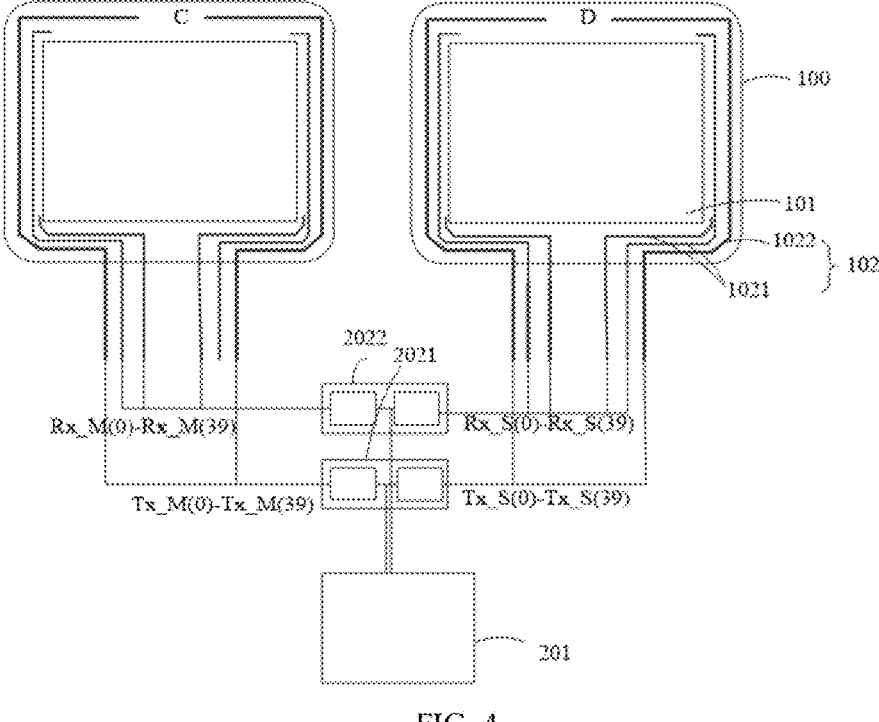
FIG. 4 is a schematic structural diagram of a third touch module in an embodiment of the present disclosure.

Referring to FIG. 4, it is a schematic structural diagram of a third touch module. As shown in FIG. 4, an integrated unit 202 includes a first integrated unit 2021 and a second integrated unit 2022. The TIC 201 is configured to output a drive signal to the plurality of first integrated units 2021 and receive sensing signals inputted by the plurality of second integrated units 2022.

One first integrated unit 2021 corresponds to a plurality of touch driving lines 1022 from different touch substrates 100, and one second integrated unit 2022 corresponds to a plurality of touch sensing lines 1021 from different touch substrates 100.

The first integrated unit 2021 includes a plurality of drive circuits connected in parallel, and each drive circuit is configured to introduce a drive signal for a touch driving line 1022 on a touch substrate 100. The second integrated unit 2022 includes a plurality of sensing circuits connected in parallel, and each sensing circuit is configured to receive a sensing signal on a touch sensing line 1021 on a touch substrate 100.

As shown in FIG. 4, the touch substrates 100 are all mutual capacitive touch substrates 100. For a self-capacitive touch substrate, sensing electrodes and drive electrodes are included. The drive electrodes may be arranged along the first direction, and the sensing electrodes may be arranged along the second direction. The first direction may be a horizontal direction looking down on the touch substrate 100, and the second direction may be a longitudinal direction looking down on the touch substrate 100, thereby forming a plurality of rows of drive electrodes and a plurality of columns of sensing electrodes. One touch driving line 1022 is connected in series to a plurality of drive electrodes in the same row, and one touch sensing line 1021 is connected in series to a plurality of sensing electrodes in the same column. Of course, in other examples, the first direction may be a longitudinal direction looking down on the touch substrate 100, and the second direction may be a horizontal direction looking down on the touch substrate 100, thereby forming a plurality of columns of drive electrodes and a plurality of rows of sensing electrodes.

Since the touch substrate is the mutual capacitive touch substrate, a touch position needs to be determined according to the capacitance between the drive electrode and the sensing electrode. Therefore, an orthographic projection of the drive electrode on the sensing layer overlaps with the sensing electrode.

The first integrated unit 2021 may be a unit configured to integrate touch driving lines 1022 from different touch substrates 100, and the second integrated unit 2022 may be a unit configured to integrate touch sensing lines 1021 from different touch substrates 100.

The number of the first integrated units 2021 may be determined according to the number of touch driving lines 1022 provided in the touch substrate 100. As described above, the number of first integrated units 2021 needs to be redundantly provided to satisfy the number requirements of the touch driving lines 1022 on a plurality of touch substrates 100. For example, for the touch substrate 100 with the largest number of touch driving lines 1022, the number of touch driving lines 1022 provided therein is m, and then the number of first integrated units 2021 needs to be greater than m.

As shown in FIG. 4, the touch driving lines 1022 included by the touch substrate C are Tx_M(0)-Tx_M(39), a total of 40 touch driving lines 1022. The touch driving lines 1022 included by the touch substrate D are Tx_S(0)-Tx_S(39), a total of 40 touch driving lines 1022. Thus, there are correspondingly 40 first integrated units 2021, and the TIC 201 needs to have 40 I/O interfaces by the same reasoning.

Of course, if the touch driving lines 1022 included by the touch substrate C are Tx_M(0)-Tx_M(39), and the touch driving lines 1022 included by the touch substrate D are Tx_S(0)-Tx_S(19), a total of 20 touch driving lines 1022, 40 first integrated units 2021 are required accordingly, and the TIC 201 needs to have 40 I/O interfaces by the same reasoning.

By the same reasoning, the number of the second integrated units 2022 may be determined according to the number of touch sensing lines 1021 provided in the touch substrate 100. As described above, the number of second integrated units 2022 needs to be redundantly provided to satisfy the number requirements of the touch sensing lines 1021 on a plurality of touch substrates 100. For example, for the touch substrate 100 with the largest number of touch sensing lines 1021, the number of touch sensing lines 1021 provided therein is j, and then the number of second integrated units 2022 needs to be greater than j.

As shown in FIG. 4, the touch sensing lines 1021 included by the touch substrate C are Rx_M(0)-Rx_M(39), a total of 40 touch sensing lines 1021. The touch sensing lines 1021 included by the touch substrate D are Rx_S(0)-Rx_S(39), a total of 40 touch sensing lines 1021. Thus, there are accordingly 40 second integrated units 2022, and the TIC 201 needs to have 40 I/O interfaces by the same reasoning.

Of course, if the touch sensing lines 1021 included by the touch substrate C are Rx_M(0)-Rx_M(29), and the touch sensing lines 1021 included by the touch substrate D are Rx_S(0)-Rx_S(29), a total of 30 touch sensing lines 1021, 30 second integrated units 2022 are required accordingly, and the TIC 201 needs to have 30 I/O interfaces by the same reasoning.

In practice, the first integrated unit 2021 corresponds to the touch driving line 1022 and may receive the drive signal outputted by the TIC 201 and input the drive signal to the touch driving line 1022 on the corresponding touch substrate 100. As shown in FIG. 4, the purpose of inputting the drive signal to a touch driving line 1022 on a certain touch substrate 100 may be achieved through a plurality of drive circuits connected in parallel. Different drive circuits are connected to touch driving lines 1022 on different touch substrates 100. When touch detection is performed on the target touch substrate 100, the drive signal outputted by the TIC 201 is inputted to one touch driving line 1022 on the target touch substrate 100 via a drive circuit corresponding to the target touch substrate.

By the same reasoning, the second integrated unit 2022 corresponds to the touch sensing line 1021. Then, the second integrated unit 2022 may receive a sensing signal inputted by a touch sensing line 1021 on the corresponding touch substrate 100 and transmit the sensing signal to the TIC 201. As shown in FIG. 4, the purpose of inputting the sensing signal of a touch sensing line 1021 on a certain touch substrate 100 to the TIC 201 may be achieved through a plurality of sensing circuits connected in parallel. Different sensing circuits are connected to touch sensing lines 1021 on different touch substrates 100. When touch detection is performed on the target touch substrate 100, a sensing signal outputted by one touch sensing line 1021 on the target touch substrate 100 is inputted to the TIC 201 via a sensing circuit corresponding to the target touch substrate.

Figure 5B:
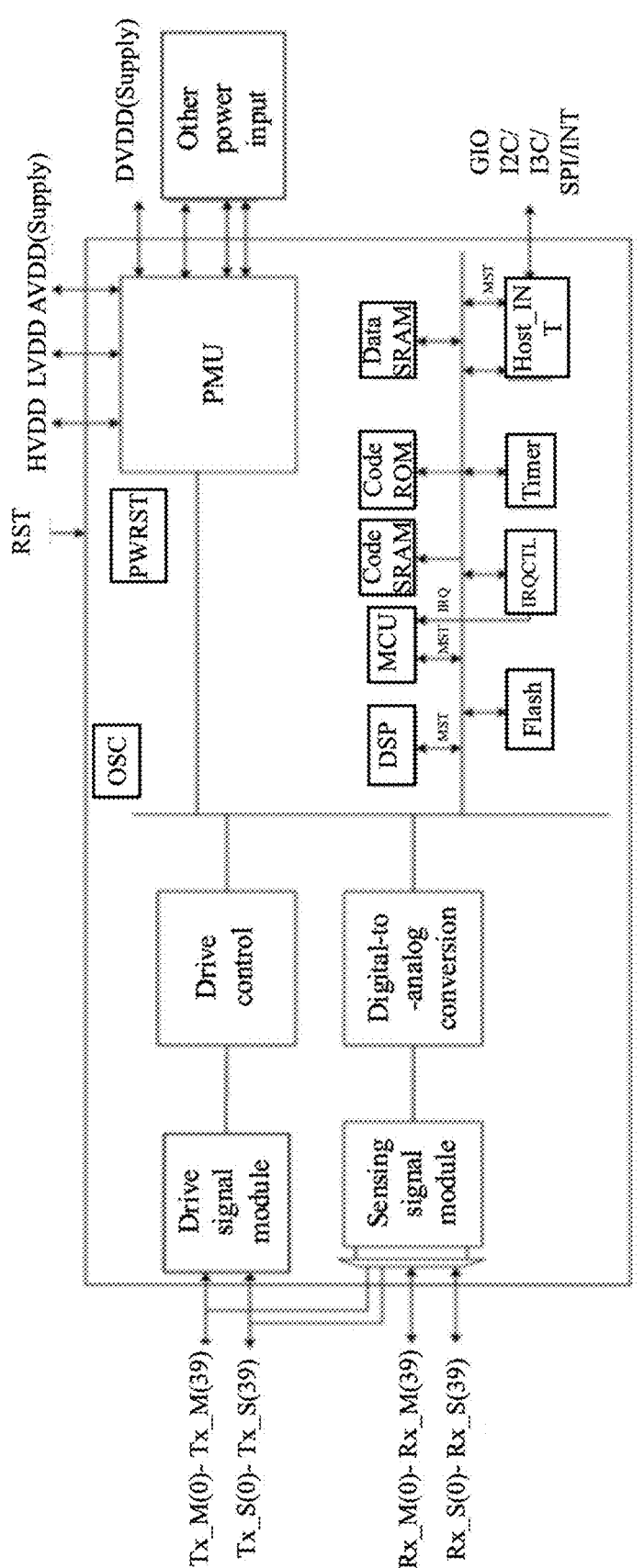
FIG. 5*b* is a schematic diagram of an overall structure of a touch driving module of the third touch module shown in FIG. 4.

Referring to FIGS. 5a and 5b, FIG. 5a is a schematic diagram of detailed structures of first integrated units 2021, second integrated units 2022, and a TIC 201 in the third touch module shown in FIG. 4, and FIG. 5b is a schematic diagram of an overall structure of a touch driving module of the third touch module shown in FIG. 4. As shown in FIG. 5b, touch driving lines of a touch substrate C and a touch substrate D are connected to a drive signal module and a sensing signal module after passing through the MUX, and touch sensing lines of the touch substrate C and the touch substrate D are connected to the sensing signal module after passing through the MUX. Thus, it is possible to facilitate subsequent drive electrode-based self-capacitive touch detection on the touch substrate C and the touch substrate D.

In some embodiments, as shown in FIG. 5a, the first integrated unit 2021 includes a plurality of drive circuits connected in parallel, and the drive circuit may include a fourth switch, a fifth switch, a sixth switch, and a seventh switch according to practical requirements.

The touch driving line 1022 is connected to a first terminal of the fourth switch, a first terminal of a fifth switch, a first terminal of the sixth switch, and a first terminal of the seventh switch.

Second terminals of the fourth switch and the fifth switch are connected to a power signal output terminal of the TIC 201, a second terminal of the sixth switch is grounded, and a second terminal of the seventh switch is connected to a drive signal output terminal of the TIC 201.

The fourth switch is configured to receive a positive voltage outputted by the power signal terminal, the fifth switch is configured to receive a negative voltage outputted by the power signal terminal, and the drive signal output terminal is configured to output the drive signal.

FIG. 5a is only a schematic diagram of drive circuits of the 19th channel and drive circuits of the 20th channel. In practice, the drive circuits of the other channels are identical to the drive circuits of the 19th channel and the drive circuits of the 20th channel.

Taking the touch substrate C as an example, a drive circuit connected to the touch substrate C includes a fourth switch HCTRL, a fifth switch LCTRL, a sixth switch GCTRL, and a seventh switch P1. The touch driving line of the touch substrate C is connected to a first terminal of the fourth switch HCTRL, a first terminal of the fifth switch LCTRL, a first terminal of the sixth switch GCTRL, and a first terminal of the seventh switch P1.

The fourth switch HCTRL is connected to the power signal output terminal of the TIC 201 for receiving a sent positive voltage signal, and a second terminal of the fifth switch LCTRL is connected to the power signal output terminal of the TIC 201 for receiving a sent negative voltage signal. A second terminal of the sixth switch GCTRL is grounded, and a second terminal of the seventh switch P1 is connected to the drive signal output terminal of the TIC 201 for controlling a connection path between the TIC and a touch driving line. It should be noted that in mutual capacitive touch detection, the seventh switch P1 is turned off, and in self-capacitive touch detection, the seventh switch P1 is turned on. For details, reference may be made to the description of the subsequent embodiments.

When touch detection is performed on the target touch substrate 100, the touch driving module 200 may output a timing control signal, and under the control of the timing control signal, control the opening and closing of the fourth switch and the fifth switch to input pulse signals to the touch driving line 1022 on the target touch substrate 100 at different timing sequences. For the specific process, reference may be made to the description of the subsequent embodiments of a touch driving method, which will not be described in detail here.

In FIG. 5a, the HVDD refers to a positive voltage, and the LVDD refers to a negative voltage, which are generated by the PMU in the TIC 201 and outputted to the fourth switch and the fifth switch through the power signal terminal. The power signal terminal may include a positive voltage terminal and a negative voltage terminal. The positive voltage terminal is connected to the fourth switch, and the negative voltage terminal is connected to the fifth switch.

The states of the fourth switch and the fifth switch may be controlled by the timing control signal in the TIC.

In some embodiments, as shown in FIG. 5a, the second integrated unit 2022 includes a plurality of sensing circuits connected in parallel, and the sensing circuit may include a first switch, a second switch, and a third switch according to practical requirements.

The touch sensing line 1021 is connected to a first terminal of the first switch, a first terminal of the second switch, and a first terminal of the third switch.

A second terminal of the first switch is grounded, and second terminals of the second switch and the third switch are connected to the TIC 201. The second switch is configured to receive a positive voltage outputted by the TIC 201, and the third switch is configured to input the sensing signal on the touch sensing line 1021 to the TIC 201.

FIG. 5a is only a schematic diagram of sensing circuits of the 0th channel. In practice, the sensing circuits of the other channels are identical to the sensing circuits of the 0th channel.

Taking the touch substrate C as an example, a sensing circuit connected to the touch substrate C includes: a first switch RGCTRL, a second switch RHCTRL, and a third switch P1'. The touch sensing line 1021 of the touch substrate C is connected to a first terminal of the first switch RGCTRL, a first terminal of the second switch RHCTRL, and a first terminal of the third switch RHCTRL. A second terminal of the first switch RGCTRL is grounded, and second terminals of the second switch RHCTRL and the third switch P1' are connected to the TIC 201. The second switch RHCTRL is configured to receive a positive voltage outputted by the TIC 201, and the third switch P1' is configured to input a sensing signal on the touch sensing line 1021 to the TIC 201. In mutual capacitive and self-capacitive touch detection, the third switch P1' may be configured to control the conducting and turning off between the touch sensing line 1021 of the touch substrate C and the TIC.

As shown in FIG. 5a, for the mutual capacitive touch substrate 100, an anti-static unit may be provided for the touch driving line 1022. The anti-static unit is configured to avoid interference of static electricity generated by the drive circuit when the drive signal passes through the drive circuit.

Specifically, the touch driving line 1022 is connected to the first terminal of the fourth switch, the first terminal of the fifth switch, and the first terminal of the sixth switch, and then is connected to the first terminal of the seventh switch after being connected in series to the anti-static unit.

In some optical embodiments, the TIC 201 may include a first binding area and a second binding area, and the integrated unit 202 may be located in the first binding area or the second binding area.

The first binding area may be a pin area of the TIC or an I/O interface area of the TIC. In this embodiment, the touch signal line 102 on the touch substrate 100 is arranged to the touch driving module 200 after being led out by the touch substrate 100, and is connected to the TIC 201 after passing the MUX in an integrated unit 202 in the first binding area of the touch driving module 200, or is connected to the TIC 201 after passing the MUX in an integrated unit 202 in the second binding area of the touch driving module 200.

It should be noted that in the above-mentioned two touch modules, the number of I/O interfaces of the TIC 201 needs to be the same as the number of integrated units 202, or at least greater than the number of integrated units 202. For example, for the self-capacitive touch substrate 100, the number of I/O interfaces of the TIC 201 needs to be the same as the number of integrated units 202, and the number of integrated units 202 needs to be at least greater than the number of touch signal lines 102 on the corresponding touch substrate 100 with the largest number of touch signal lines 102.

For example, for the mutual capacitive touch substrate 100, the number of signal input interfaces (configured to receive sensing signals of the touch sensing lines 1021) of the TIC 201 needs to be the same as the number of the second integrated units 2022, and the number of the second integrated units 2022 needs to be at least greater than the number of the touch sensing lines 1021 on the corresponding touch substrate 100 with the largest number of touch sensing lines 1021. The number of signal output interfaces (configured to output drive signals) of the TIC 201 needs to be the same as the number of the first integrated units 2021, and the number of the first integrated units 2021 needs to be at least greater than the number of touch driving lines 1022 on the corresponding touch substrate 100 with the largest number of touch driving lines 1022. Thus, it is possible to realize a redundant design of the touch substrate 100 so that the touch driving module 200 may satisfy a plurality of touch substrates 100 with different numbers of touch signal lines 102.

Of course, in some optical embodiments, in the case where the touch substrates 100 include the self-capacitive touch substrate 100 and the mutual capacitive touch substrate 100, the integrated unit 202 may include a first integrated unit 2021 and a second integrated unit 2022. The first integrated unit 2021 includes at least one drive circuit connected in parallel, and the drive circuit is configured to connect a touch driving line 1022 on a mutual capacitive touch substrate 100. The second integrated unit 2022 includes at least one sensing circuit connected in parallel, and the sensing electrode is configured to connect a touch sensing line 1021 on a mutual capacitive touch substrate 100.

A touch signal line 102 on the self-capacitive touch substrate 100 may be connected to a signal transmission circuit in the first integrated unit 2021 or connected to a signal transmission circuit in the second integrated unit 2022. The signal transmission circuit may be the same as the sensing circuit or the same as the drive circuit.

When it is necessary to perform touch detection on the mutual capacitive touch substrate 100, a drive signal is inputted to the touch driving line 1022 on the mutual capacitive touch substrate 100 using the drive circuit on the first integrated unit 2021, and a sensing signal inputted via the touch sensing line 1021 on the mutual capacitive touch substrate 100 is received using the sensing circuit on the second integrated unit 2022 to perform touch detection based on the sensing signal.

When it is necessary to perform touch detection on the self-capacitive touch substrate 100, assuming that the signal transmission circuit is located in the first integrated unit 2021, all the drive circuits in the first integrated unit 2021 and the sensing circuits in the second integrated unit 2022 may be turned off to cut off the connection between the mutual capacitive touch substrate 100 and the TIC. Meanwhile, a drive signal is inputted to the touch signal line 102 on the self-capacitive touch substrate 100 using the signal transmission circuit on the first integrated unit 2021, and a sensing signal inputted via the touch signal line 102 on the self-capacitive touch substrate 100 is received to perform self-capacitive touch detection based on the sensing signal.

When this embodiment is used, in the case where the touch module includes the self-capacitive touch substrate 100 and the mutual capacitive touch substrate 100, touch switching between the self-capacitive touch substrate 100 and the mutual capacitive touch substrate 100 may still be realized, thereby satisfying different touch requirements.

Since touch signal lines 102 of a plurality of touch substrate 100 need to be connected to the same touch driving module 200, the touch signal lines 102 of the touch substrates 100 need to be routed to the position where the touch driving module 200 is located. The touch driving module 200 may be located on the same panel 300 as any one of the touch substrates 100. Thus, the touch signal lines 102 of the remaining touch substrates 100 need to be routed to the panel where the touch driving module 200 is located. Thus, a relatively large number of touch signal lines 102 need to be routed across the panel, and routing across the panel tends to cause breakage of the signal lines while crossing the panel. For example, folding/unfolding or the like between the panels may cause breakage of the touch signal lines 102. In an example, a flexible circuit board may be adopted to transfer the touch signal lines 102 of the remaining touch substrates 100 to the panel where the touch driving module 200 is located.

The panel 300 may be a display panel, or may be a base substrate where the touch substrate is located.

Figure 6:
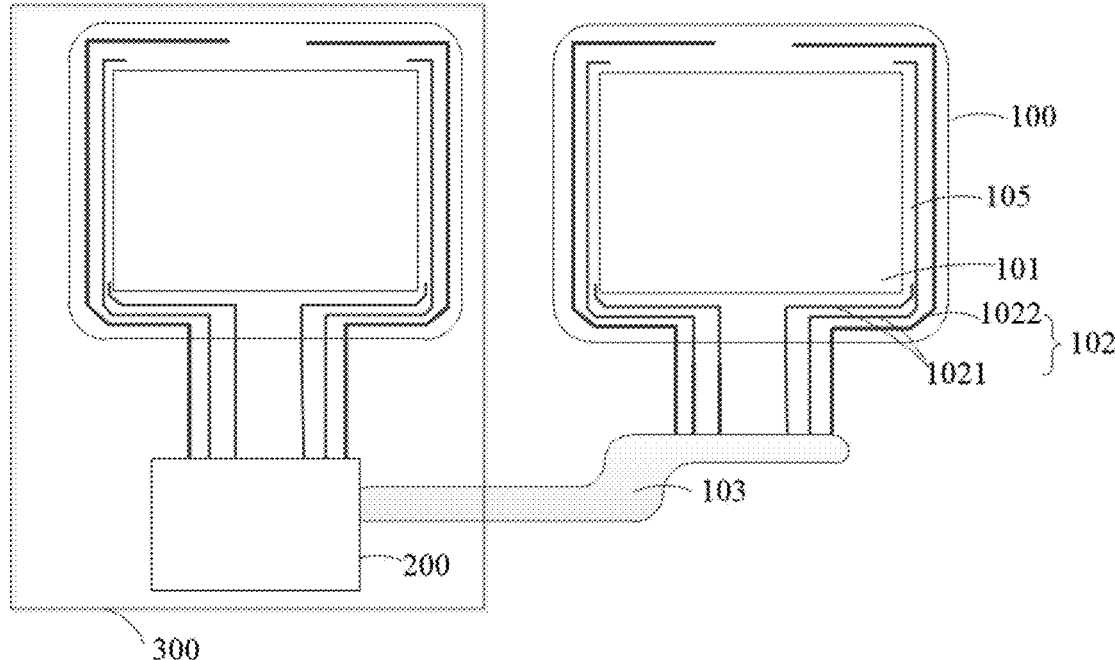
FIG. 6 is a schematic diagram of a connection structure between a touch substrate and a touch driving module in an embodiment of the present disclosure.

Referring to FIG. 6, it is a schematic diagram of a connection structure between a touch substrate 100 and a touch driving module 200. In practice, in order to connect a plurality of touch signal lines 102 on the touch substrate 100 to the touch driving module 200, a flexible circuit board may be added between the touch substrate 100 and the touch driving module 200, and the touch signal lines 102 on the touch substrate 100 are connected to the touch driving module 200 using the flexible circuit board.

Specifically, as shown in FIG. 6, the touch driving module 200 and the first touch substrate 100 are provided in the same panel, and the touch module further includes: a first flexible circuit board 103. The first flexible circuit board 103 is configured to connect a plurality of touch signal lines 102 on a second touch substrate 100 to the touch driving module 200. The second touch substrate 100 is a touch substrate 100 except the first touch substrate 100.

The first flexible circuit board 103 may be a highly reliable and excellent flexible printed circuit (FPC) made of a base material of polyimide or polyester film and has the characteristics of high wiring density, light weight, thin thickness, and good bending.

In this embodiment, the touch substrate 100 generally includes a touch area and a non-touch area adjacent to the touch area. The non-touch area is generally configured to route the touch signal lines 102, and the touch area is configured to provide touch electrodes 106. After the touch signal line 102 is connected to the touch electrode 106, the touch signal line 102 is led out from the touch area and routed in the non-touch area.

As shown in FIG. 6, after a touch signal line 102 on a first touch substrate 100 (a touch substrate on the left side of FIG. 6) is led out to a non-touch area 105, the touch signal line 102 is connected to the touch driving module 200 located in the panel. Since the touch driving module 200 and the first touch substrate 100 are located in the same panel, after the touch signal line 102 of the first touch substrate 100 is led out, a routing distance thereof is short, the space occupation is small, and the touch signal line 102 may be directly connected to the touch driving module 200. Specifically, the touch signal line 102 may be connected to the signal transmission circuit in the integrated unit 202 in the touch driving module 200.

As shown in FIG. 6, after a touch signal line 102 on a second touch substrate 100 (a touch substrate on the right side of FIG. 6) is led out to a non-touch area 105, the touch signal line 102 may be connected to the first flexible circuit board 103 and then connected to the touch driving module 200 on the other panel through the first flexible circuit board 103. Then, after the touch signal line 102 of the second touch substrate 100 is led out, since the routing thereof needs to be arranged across the panel into the other panel, a routing distance is long. After transferring through the first flexible circuit board 103, the problem that the touch signal line 102 is easily broken in the routing across the panel may be avoided.

An exemplary touch module is described below through a specific example.

Taking the touch module shown in FIG. 5a as an example, two mutual capacitive touch substrates 100 and one touch driving module 200 are included. The structures of the two touch substrates 100 each include:

a touch layer, wherein a plurality of drive electrodes arranged along a first direction are provided on the touch layer, and the first direction is a row direction; after a touch driving line 1022 is connected in series to a plurality of drive electrodes of a row, the touch driving line 1022 is led out to an outer side of the touch substrate 100; and a sensing layer, wherein a plurality of sensing electrodes arranged along a second direction are provided on the sensing layer, and the second direction is a column direction; after a touch sensing line 1021 is connected in series to a plurality of sensing electrodes of a column, the touch sensing line 1021 is led out to an outer side of the touch substrate 100.

The touch driving line 1022 may be routed on the touch layer, and the touch sensing line 1021 may be routed on the sensing layer. An orthographic projection of the drive electrode on the sensing layer overlaps with the sensing electrode.

Different from what is shown in FIG. 5a, in the touch module in this example, a touch substrate E of the two touch substrates 100 includes a 40×40 channel, i.e., including 40 rows of drive electrodes and 40 columns of sensing electrodes, and the other touch substrate F includes a 20×40 channel, i.e., including 20 rows of drive electrodes and 40 columns of sensing electrodes.

The touch sensing lines 1021 of the touch substrate C are Rx_M(0)-Rx_M(39), and the touch driving lines 1022 of the touch substrate C are Tx_M(0)-Tx_M(39). The touch driving lines 1022 of the touch substrate D are Tx_S(0)-Tx_S (19), and the touch sensing lines 1021 are Rx_M(0)-Rx_M (39).

The touch driving module 200 includes 40 first integrated units 2021 and 40 second integrated units 2022. Each first integrated unit 2021 corresponds to a row of touch driving lines 1022 in the two touch substrates 100, and each second integrated unit 2022 corresponds to a column of touch sensing lines 1021 in the two touch substrates 100.

The first integrated unit 2021 includes two drive circuits connected in parallel. One drive circuit is configured to connect one touch driving line 1022 on the touch substrate E, and the other drive circuit is configured to connect one touch driving line 1022 on the touch substrate F. As shown in FIG. 5a, two drive circuits in each of the 20 first integrated units 2021 are connected to touch driving lines 1022 on the touch substrate E and the touch substrate F, and in the other 20 first integrated units 2021, only one drive circuit is connected to one touch driving line 1022 on the touch substrate E.

The circuit structure of the drive circuit is shown in FIG. 5a.

The second integrated unit 2022 includes two sensing circuits connected in parallel. One sensing circuit is configured to connect one touch sensing line 1021 on the touch substrate E, and the other sensing circuit is configured to connect one touch sensing line 1021 on the touch substrate F. As shown in FIG. 5a, two sensing circuits connected in parallel in each of the 40 second integrated units 2022 are connected to the touch sensing lines 1021 on the touch substrate E and the touch substrate F.

The circuit structure of the drive circuit is shown in FIG. 5a.

According to the touch module of this embodiment, the following advantages are provided.

Firstly, only one set of capacitive and resistive components needs to be configured for the touch driving module 200 so that the manufacturing cost and power consumption are reduced.

Secondly, since the plurality of touch substrates 100 may share one TIC, the synchronization of the active pen functions and performances configured by the plurality of touch substrates 100 in the touch module may be ensured so that the plurality of touch substrates 100 may maintain the active pen functions.

Based on the same inventive concept, embodiments of the present disclosure also provide a display device, including the touch module of the above-mentioned embodiments and display panels 400 corresponding to a plurality of touch substrates 100 in the touch module, respectively. The touch substrates 100 provide touch functions for the display panels 400.

The touch substrate 100 may be embedded into the display panel 400, i.e., the touch substrate 100 is an embedded touch substrate 100. Alternatively, the touch substrate 100 may also be configured into the display panel 400 as an independent substrate, i.e., the touch substrate 100 is an externally mounted touch substrate 100. No matter which type of the touch substrate 100, a touch module constituted thereby may adopt a touch driving module 200 to provide touch functions for a plurality of display panels 400 of the display device.

Thus, the display device may be provided with only one TIC 201, thereby reducing the manufacturing cost of the display device. Meanwhile, since only one touch driving module 200 needs to be configured, compared with the manner of configuring one TIC for each touch substrate 100 in the related art, the space occupied by the touch driving module 200 in the display device may be reduced to leave sufficient space for wiring or arranging a larger battery in the display device, thereby improving the standby time of the display device.

In addition, since one touch driving module 200 is used, a set of capacitor, resistor, and TVS may be built so that the ESD resistance may be realized, thereby further reducing the manufacturing cost without reducing the number of capacitive and resistive components, and thus reducing the manufacturing cost of the display device.

In this embodiment, the display device may be a mobile phone, and the display panel 400 serves as a display screen of the mobile phone. Specifically, the display device may include an infolding display device, and the infolding display device may be divided into a vertical folding display device and a horizontal folding display device. When the infolding display device is in an unfolded state, one display panel 400 is used. When the infolding display device is in a folded state, another display panel 400 is used.

Figure 7:
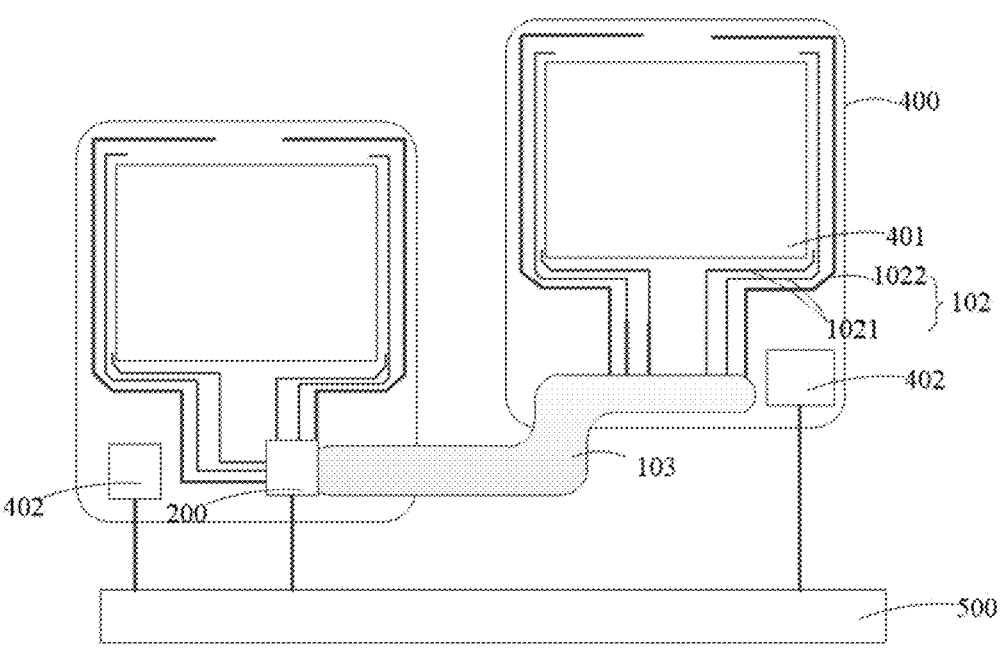
FIG. 7 is a schematic structural diagram of a display device in an embodiment of the present disclosure.

Referring to FIG. 7, it is a schematic structural diagram of a display device. As shown in FIG. 7, taking an infolding display device as an example, the display device includes two display panels 400. A third display panel 400 of the two display panels 400 is located on a non-display surface side of a fourth display panel 400. The fourth display panel 400 is a foldable panel.

The third display panel 400 displays a picture when the fourth display panel 400 is in a folded state, and the fourth display panel 400 displays a picture when the fourth display panel 400 is in an unfolded state.

In a specific example, the fourth display panel 400 in the display device may serve as a main display screen, and the third display panel 400 may serve as a secondary display screen. The fourth display panel 400 may be larger in size than the third display panel 400. Specifically, for example, the fourth display panel 400 may be 7.0-8.0 inches, and the third display panel 400 may be 6.0-7.0 inches.

The third display panel 400 is located on the non-display surface side of the fourth display panel 400. That is, the third display panel 400 may be stacked on a side of the fourth display panel 400 facing away from the display surface. The fourth display panel 400 may be infolded. When being infolded, the display surface of the fourth display panel 400 is snapped, and the third display panel 400 is configured to display a picture. When the fourth display panel 400 is in the unfolded state, the display surface of the fourth display panel 400 is fully displayed, thereby causing the fourth display panel 400 to display a picture.

As shown in FIG. 7, a complete display device may include a plurality of display panels 400 and touch substrates 100 configured to the display panels 400. A plurality of touch substrates 100 all share the same touch driving module 200. The touch driving module 200 is located in any one of the plurality of display panels 400. As shown in FIG. 7, each display panel 400 is provided with an independent display driving module 402, such as a DIC.

Each display panel 400 includes a display area 401 and a non-display area adjacent to the display area 401. The display area 401 includes a plurality of display driving lines. The plurality of display driving lines extend from the display area 401 to the non-display area, converge at one side of the non-display area, and are connected to the display driving module 402. The display driving module 402 is configured to generate a drive signal corresponding to each pixel unit in the display area 401 according to a picture to be displayed in the current period so that each sub-pixel in the pixel unit emits light under the driving of the driving signal, thereby realizing picture display.

As shown in FIG. 7, the routing of the display driving line may be routing at an edge of the non-display area, i.e., routing at a frame. The display driving lines may be connected to the display driving module 402 after converging in a binding area of the display panel 400. The binding area may be located on one side frame of the display panel 400 and is generally a frame with a large size. If the display panel 400 is of a narrow frame design, the binding area on the side frame may be located on a surface facing away from the display face of the display panel 400 after being bent.

In an example, the display device further includes a main control module 500. The main control module 500 is configured to connect to the plurality of display driving modules 402 and the touch driving module 200. The main control module 500 may be configured to determine a target display panel 400 to be switched to. A target display driving module 402 of the target display panel 400 sends a display driving signal to instruct the target display driving module 402 to drive the target display panel 400 to display a picture, and sends a touch switching signal to the touch driving module 200.

The touch driving module 200 may be configured to conduct a connection path between the touch driving module 200 and the target touch substrate 100 in response to the touch switching signal to perform touch detection on the target touch substrate 100.

Specifically, the main control module 500 may be a module for controlling a display picture and a touch function of a display device. In practice, the main control module 500 may detect a target display panel 400 to be currently displayed. Specifically, the main control module 500 may determine the target display panel 400 to be currently displayed based on a state presented among the plurality of display panels 400 and determine a touch substrate 100 configured by the target display panel 400 as the target touch substrate 100.

In an example, at least one of the plurality of display panels 400 has two different panel states. The main control module 500 is configured to detect a panel state of the display panel 400 and determine the target touch substrate 100 based on the panel state.

The touch substrate 100 is generally provided in the display panel 400. Whether the display panel 400 needs to display a picture may be determined according to the panel state of the display panel 400. Generally, when the display panel 400 needs to display a picture, the panel state thereof may be: the display face directly facing an observation sight line of a user. When the display panel 400 does not need to display a picture, the panel state thereof may be: the display surface facing away from the observation sight line of the user. Then, the main control module 500 may determine whether the display panel 400 needs to display a picture by detecting the panel state of the display panel 400 and then determine whether the touch substrate 100 provided on the display panel 400 needs to display a touch.

Illustratively, in the case where two display panels 400 are included, if one display panel 400 is in a folded state and its display surface is not directly facing the observation sight line, the other display panel 400 may be determined as the target display panel 400. If the display panel 400 is in an unfolded state and its display surface is directly facing the observation sight line, the display panel 400 may be determined as the target display panel 400.

Accordingly, in some embodiments, the main control module 500 may detect the folded state of the fourth display panel 400, i.e., may determine the target display panel 400 to be displayed. That is, when it is detected that the fourth display panel 400 is in the folded state, the target display panel 400 is determined to be the third display panel 400. When it is detected that the fourth display panel 400 is in the unfolded state, the target display panel 400 is determined to be the fourth display panel 400, and the touch substrate 100 on the fourth display panel 400 is taken as the target touch substrate 100.

In an example, the main control module 500 may also be connected to the display driving module 402 of the display panel 400 for sending display data to the target display panel 400 to be displayed to instruct the display driving module 402 of the target display panel 400 to perform driving display on the target display panel 400. Specifically, after determining the target display panel 400, the main control module 500 may transmit picture data required to be displayed on the target display panel 400 to the target display driving module 402 on the target display panel 400, and the target display driving module 402 drives the target display panel 400 to display according to the picture data.

In an embodiment, in the case where the display device has the main control module 500, the touch driving module 200 and the display driving module 402 on each display panel 400 also need to be connected to the main control module 500 to receive a signal of the main control module 500 and send a signal to the main control module 500. Specifically, the display panel 400 further includes a plurality of signal lines. The plurality of signal lines include a signal line connecting the display driving module 402 on the display panel 400 and the main control module 500, and a signal line connecting the touch driving module 200 and the main control module 500. The plurality of signal lines include at least two signal lines of an MIPI signal line, an SPI signal line, and a power line. The plurality of signal lines are arranged in the non-display area of the display panel 400, for example, in the binding area of the display panel 400.

In an example, a plurality of display panels 400 connect a plurality of signal lines to the main control module 500 through respective corresponding switching interfaces. As shown in FIG. 7, the connection of the signal lines in this case is shown.

In still another example, in order to reduce a routing area, a plurality of signal lines in a plurality of display panels 400 may be collectively arranged in one display panel 400 through a flexible circuit board so that the display panel 400 may connect the signal lines of the plurality of display panels 400 to the main control module 500 through a switching interface configured thereby.

Figure 8:
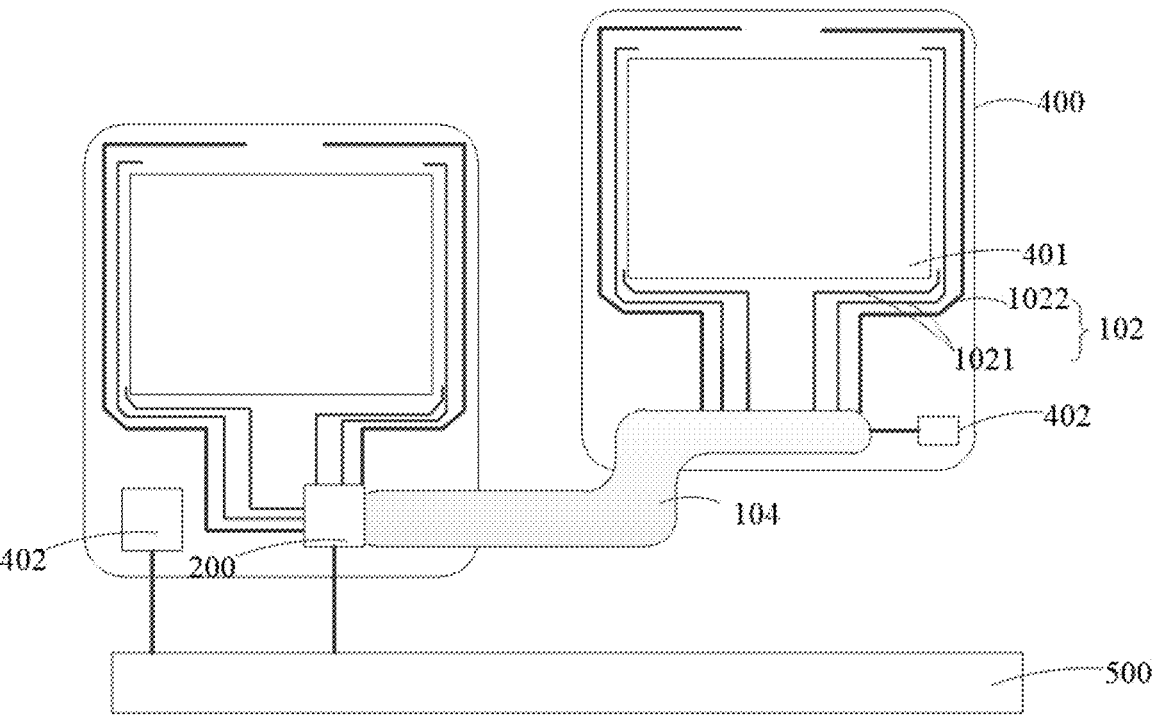
FIG. 8 is a schematic structural diagram of still another display device in an embodiment of the present disclosure.

Referring to FIG. 8, it is a schematic structural diagram of a display device. As shown in FIG. 8, the display device further includes: a second flexible circuit board 104.

The second flexible circuit board 104 is configured to transfer a plurality of signal lines in at least one first display panel 400 to the second display panel 400. A plurality of signal lines on the second display panel 400 are connected to the main control module 500 through a switching interface on the second display panel 400.

In an example, the size of the non-display area 401 of the second display panel 400 may be greater than the size of the non-display area 401 of the first display panel 400. Specifically, the display panel 400 includes a display area and a non-display area, and the non-display area includes a frame area close to at least one side of the display area. The touch driving module 200 and the plurality of signal lines are located in the frame area. Specifically, in the case where the touch driving module 200 is located in the frame area of the second display panel 400, the size of the frame area of the second display panel 400 is greater than the size of the frame area of the first display panel 400.

Thus, the plurality of signal lines and the touch driving module 200 may be routed on the second display panel 400 with a larger frame area to make full use of the space of the large frame area, thereby leaving a larger routing space for the first display panel 400 for routing the display driving lines in the first display panel 400 and providing a mounting space for other assemblies in the first display panel 400, such as a battery assembly.

The size of the display area 401 of the second display panel 400 may be greater than the size of the display area 401 of the first display panel 400, or the size of the display area 401 of the second display panel 400 may be smaller than the size of the display area 401 of the first display panel 400, which is not limited thereto.

In an embodiment, when a plurality of signal lines in a plurality of first display panels 400 may be collectively arranged in one second display panel 400 through the second flexible circuit board 104, as shown in FIG. 8, the touch driving module 200 may also be located in the second display panel 400. In this case, the touch signal lines 102 of the touch substrate 100 provided on the first display panel 400 may also be transferred to the second display panel 400 through the second flexible circuit board 104. That is, through the same flexible circuit board, a plurality of signal lines of the first display panel 400 may be transferred to the second display panel 400, and the touch signal lines 102 of the touch substrate 100 may also be transferred to the second display panel 400 together so that touch signal lines 102 of the other touch substrates 100 are connected to the touch driving module 200 in the second display panel 400.

Hereinafter, the display device in this embodiment is illustratively described through a specific example.

Figure 9A:
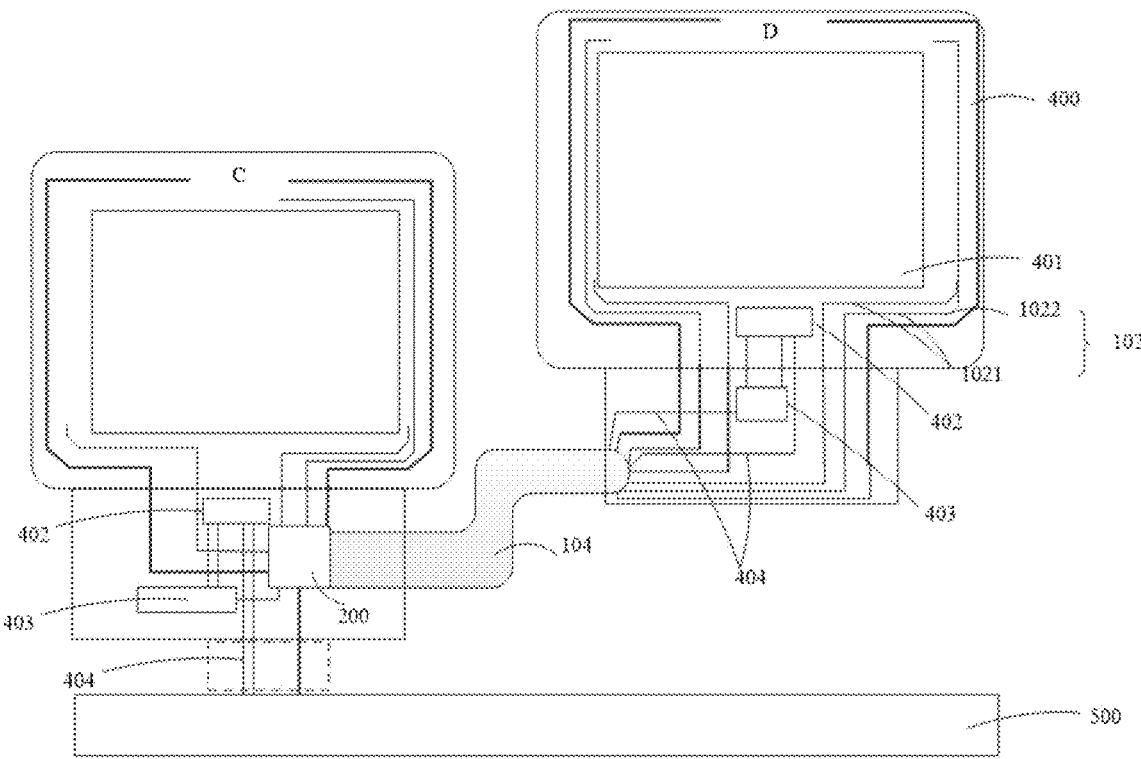
FIG. 9*a* is a schematic plan view of an exemplary display device using the touch module shown in FIG. 5*a* as an example.

Referring to FIG. 9a, it is a schematic plan view of an exemplary display device using the touch module shown in FIG. 5a as an example. As shown in FIG. 9a, the display device may be an infoldeding mobile phone, including:

two display panels 400, i.e., a display panel C and a display panel D. The display panel C is configured with the touch substrate C in FIG. 5a, and the touch substrate C provides a touch function for the display panel C. The display panel D is configured with the touch substrate D in FIG. 5a, and the touch substrate D provides a touch function for the display panel D.

The display panel D is located on a side of the display panel C facing away from the display surface, and the display panel C may be folded in the direction of the display surface. When the display panel C is folded, the display panel D is located at a position for displaying a picture to the user, and the display panel D needs to display the picture. When the display panel C is unfolded, the display surface of the display panel C is completely exposed, and the display panel C needs to display the picture.

The touch driving module 200 is located in a non-display area 401 of the display panel C. Specifically, the touch driving module 200 is located in a lower frame area of the non-display area 401 of the display panel C, and the lower frame area further includes a display driving module 402 of the display panel C, such as a DIC.

A display driving module 402 of the display panel D, such as a DIC, is arranged in a lower frame area of the non-display area 401 of the display panel D.

A plurality of touch driving lines 1022 and a plurality of touch sensing lines 1021 of the touch substrate D on the display panel D are led out from a non-touch area of the touch substrate D, routed in the frame area of the display panel D, and transferred to the display panel C through a flexible circuit board MFPC104 so as to be connected to the touch driving module 200 on the display panel C through the flexible circuit board MFPC104. In addition, a plurality of display driving lines on the display panel D are routed in the non-display area, then converged in the binding area (interface area) 403 of the display panel D, and connected to the display driving module 402. A plurality of signal lines 404 (including an MIPI signal line, an SPI signal line, and a power line) led out by the display driving module 402 are also connected to a flexible circuit board MDPC, and the plurality of signal lines are arranged in the frame area of the display panel C through the flexible circuit board MDPC.

A plurality of touch driving lines 1022 and a plurality of touch sensing lines 1021 of the touch substrate C on the display panel C are led out from a non-touch area of the touch substrate C, routed in the frame area of the display panel C, and connected to the touch driving module 200 on the display panel C.

A plurality of signal lines 404 (including an MIPI signal line, an SPI signal line, and a power line) led out from the display driving module 402 on the display panel C and a plurality of signal lines from the display panel D led in by the flexible circuit board MDPC are all connected to the main control module 500 through a switching interface.

When the display device is in a working state, the main control module 500 detects the states of the two display panels 400. If the display panel C is folded, it is determined that the display panel D is a panel to be displayed. The main control module 500 sends picture data of the display panel D to the display driving module 402 on the display panel D through a plurality of signal lines and sends a touch switching signal to the touch driving module 200 through the plurality of signal lines.

The display driving module 402 of the display panel D drives a plurality of sub-pixels in the display panel D to emit light according to the picture data so as to display a picture.

The touch driving module 200 cuts off a connection path between the touch driving module 200 and the touch substrate C and conducts a connection path between the touch driving module 200 and the touch substrate D according to the touch switching signal, i.e., establishing a connection path between the touch driving module 200 and the touch signal line 102 on the flexible circuit board MDPC to perform touch detection on the touch substrate D so that the touch substrate D is adopted to provide a touch function for the display panel D while the display panel D is driven and displayed.

Of course, if the display panel C is unfolded, it is determined that the display panel C is a panel to be displayed. The main control module 500 sends picture data of the display panel C to the display driving module 402 on the display panel C through a plurality of signal lines and sends a touch switching signal to the touch driving module 200 through the plurality of signal lines.

The touch detection of the touch substrate C may refer to the above-mentioned touch detection of the touch substrate D and will not be described in detail here.

Figure 9B:
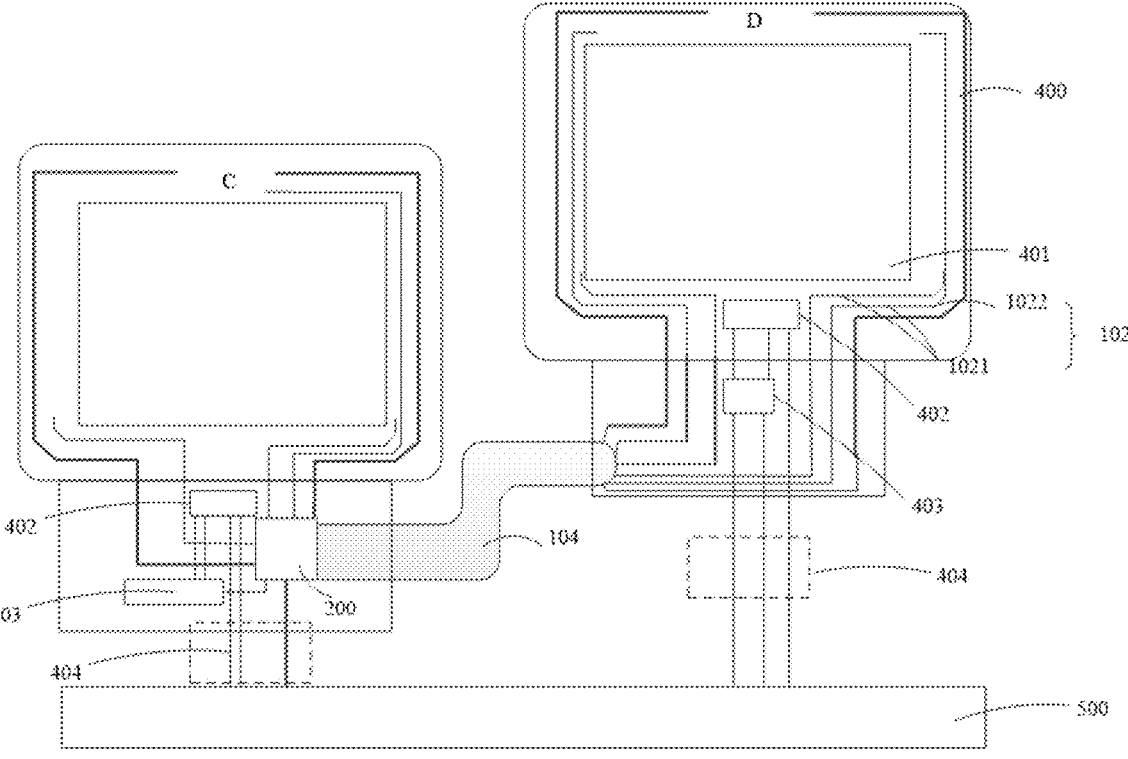
FIG. 9*b* is a schematic plan view of another exemplary display device using the touch module shown in FIG. 5*a* as an example.

Referring to FIG. 9b, a display device in a specific example is also provided. In the display device, a display panel C and a display panel D are provided. The display panel C is configured with the touch substrate C in FIG. 5a, and the touch substrate C provides a touch function for the display panel C. The display panel D is configured with the touch substrate D in FIG. 5a, and the touch substrate D provides a touch function for the display panel D. In FIG. 9b, a plurality of signal lines of the display panel C and the display panel D are connected to the main control module 500 through respective switching interfaces. The rest of the structure is shown with reference to FIG. 9a.

According to the above-mentioned display device, the following advantages are provided.

Firstly, the display device may be provided with only one TIC 201, thereby reducing the manufacturing cost of the display device.

Secondly, since only one touch driving module 200 needs to be configured, compared with the manner of configuring one TIC for each touch substrate 100 in the related art, the space occupied by the touch driving module 200 in the display device may be reduced to leave sufficient space for wiring or arranging a larger battery in the display device, thereby improving the standby time of the display device.

Thirdly, since one touch driving module 200 is used, a set of capacitor, resistor, and TVS may be built so that the ESD resistance may be realized, thereby further reducing the manufacturing cost without reducing the number of capacitive and resistive components, and thus reducing the manufacturing cost of the display device.

Based on the same inventive concept, the present disclosure also provides a touch driving method. As shown in FIG. 10, the touch driving method may be applied to the above-mentioned touch module or the above-mentioned display device and specifically include the following steps:

S1001: determining a target touch substrate 100 to be currently touch-driven;

S1002: cutting off a connection path between the touch driving module 200 and a third touch substrate 100 except the target touch substrate 100, and conducting a connection path between the touch driving module 200 and the target touch substrate 100; and S1003: performing touch detection on the target touch substrate 100 through the touch driving module 200.

In this embodiment, the target touch substrate 100 to be currently touch-driven may be determined by the main control module 500. Further, the main control module 500 may determine the target touch substrate 100 based on the state between the touch substrates 100, for example, determining based on the folded state of the panel where the touch substrate C is located. If the panel is folded, the main control module 500 determines the touch substrate D as the target touch substrate 100, and if the panel is unfolded, the main control module 500 determines the touch substrate E as the target touch substrate 100. Specifically, reference may be made to the description of the embodiments of the display device described above.

After determining the target touch substrate 100, the touch driving module 200 may cut off a connection path between the touch driving module 200 and a third touch substrate 100 except the target touch substrate 100 and conduct a connection path between the touch driving module 200 and the target touch substrate 100 so that the touch driving module 200 performs touch detection on the target touch substrate 100.

In an example, touch detection may include mutual capacitive touch detection and self-capacitive touch detection. The touch detection on the target touch substrate 100 may be mutual capacitive touch detection or self-capacitive touch detection, or the touch detection on the target touch substrate 100 may include both the mutual capacitive touch detection and the self-capacitive touch detection.

The specific process of touch detection may be described with reference to the above-mentioned embodiments of the touch module and will not be described in detail here.

Specifically, in this example, the touch substrate 100 may be a mutual capacitive touch substrate 100, i.e., including a plurality of touch driving lines 1022 and a plurality of touch sensing lines 1021. The touch driving lines 1022 are connected in series to a plurality of drive electrodes arranged along a first direction, and the touch sensing lines 1021 are connected in series to a plurality of sensing electrodes arranged along a second direction. The first direction intersects or is orthogonal to the second direction.

When touch detection is performed on the target touch substrate 100 through the touch driving module 200, mutual capacitive touch detection and self-capacitive touch detection may be performed at different times. Specifically, in a first time period, mutual capacitive touch detection is performed on the target touch substrate 100. In a second time period, self-capacitive touch detection is performed on the target touch substrate 100. Then, a touch signal may be acquired based on the mutual capacitive touch detection and the self-capacitive touch detection. The first time period and the second time period do not overlap.

The principle of mutual capacitive touch detection is as follows: since there is an overlap between the sensing electrode and the drive electrode, a capacitor will be formed at an overlapping part of the electrodes, i.e., two layers of electrodes at the overlapping part constitute two poles of the capacitor, respectively. When a finger touches the touch substrate, the coupling between two electrodes near a touch point is affected, thereby changing the capacitance between the two electrodes. The touch sensing line 1021 will transmit the change of the capacitance as a sensing signal to the TIC 201, and the TIC 201 may determine the touch position based on the change of the sensing signal and the position of the sensing line.

The principle of self-capacitive touch detection is as follows: each touch electrode 106 is connected to a touch signal line 102, and the capacitance borne by each touch electrode 106 is a fixed value. When a person performs a touch operation, the capacitance borne by a corresponding touch electrode 106 is the fixed value plus the human body capacitance. The TIC 201 scans the touch electrodes 106 row by row or column by column and receives feedback signals of the touch electrodes 106. When a touch occurs, the capacitance value of the touch electrode 106 at a touched position changes, and the TIC 201 determines the touch position according to the capacitance change.

In the case where mutual capacitive touch detection and self-capacitive touch detection are required, the touch substrate 100 may be a mutual capacitive touch substrate 100. In the first time period, when mutual capacitive touch detection is performed on the target touch substrate 100, the touch driving module 200 may input a drive signal to the touch driving line 1022 of the target touch substrate 100 and receive a sensing signal transmitted back by the touch sensing line 1021 of the target touch substrate 100. After one touch detection is performed on the entire target touch substrate 100, self-capacitive touch detection may be performed on the target touch substrate 100 in the second time period, and the touch driving module 200 may input a drive signal to the touch driving line 1022 of the target touch substrate 100 and receive a sensing signal transmitted back by the touch driving line 1022 of the target touch substrate 100. Alternatively, the touch driving module 200 may input a drive signal to the touch sensing line 1021 of the target touch substrate 100 and receive a sensing signal transmitted back by the touch sensing line 1021 of the target touch substrate 100.

Of course, the first time period may precede the second time period, or the first time period may follow the second time period. In practice, the order of the first time period and the second first time period may be determined according to the requirements and will not be described in detail here.

When the touch signal is acquired based on the mutual capacitive touch detection and the self-capacitive touch detection, the touch driving module 200 may determine the touch position by combining the result of the mutual capacitive touch detection and the result of the self-capacitive touch detection, thereby improving the accuracy of determining the touch position and avoiding mis-determination. The interval between the first time period and the second time period may be small, for example, less than 1 ms, thereby avoiding the problem that the time interval is long and the accuracy of determining the touch position is reduced.

Figure 11:
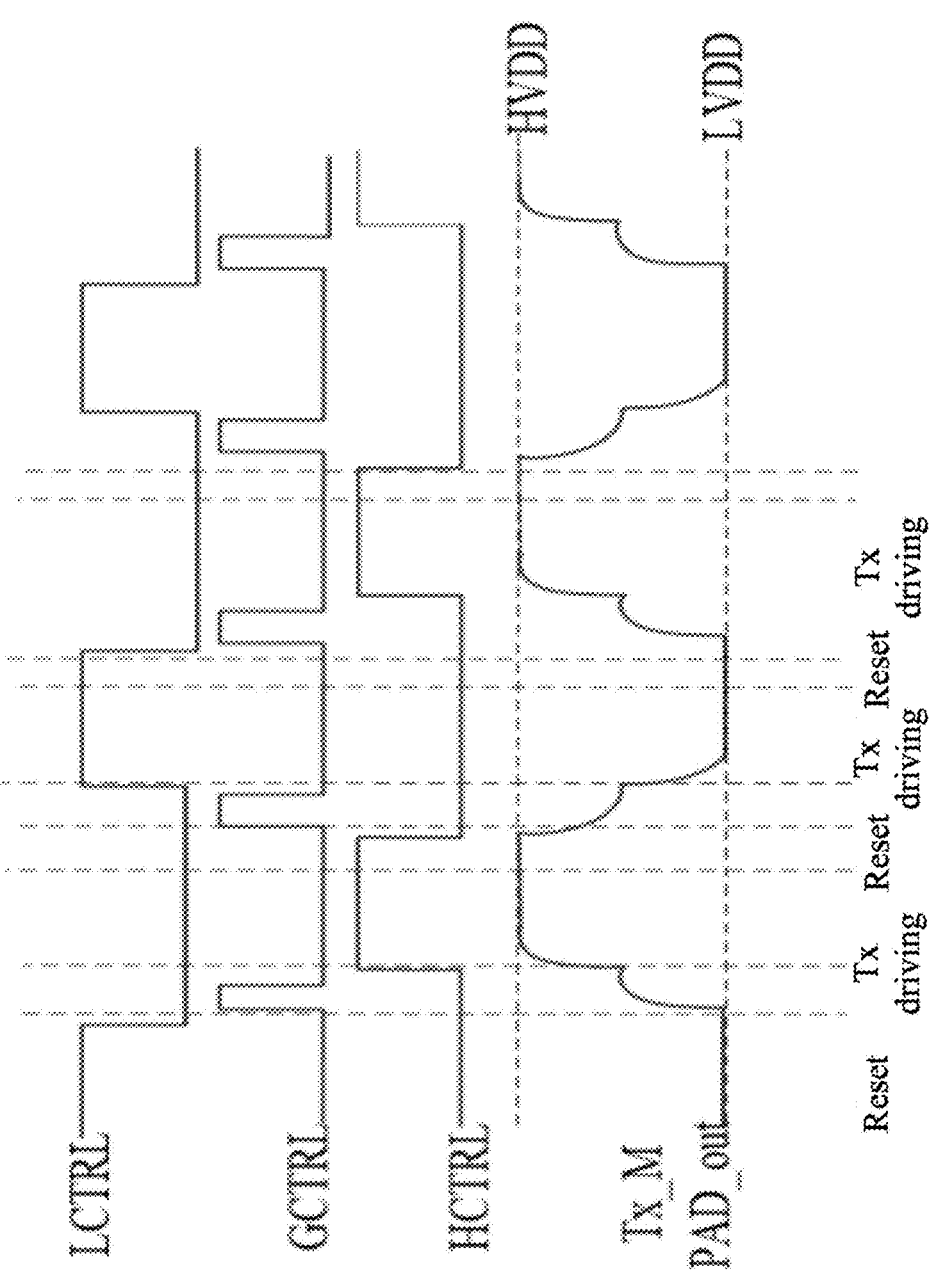
FIG. 11 is a timing diagram of a mutual capacitive touch drive circuit for periodically detecting a target touch substrate shown in FIG. 5*a;*
Figure 12:
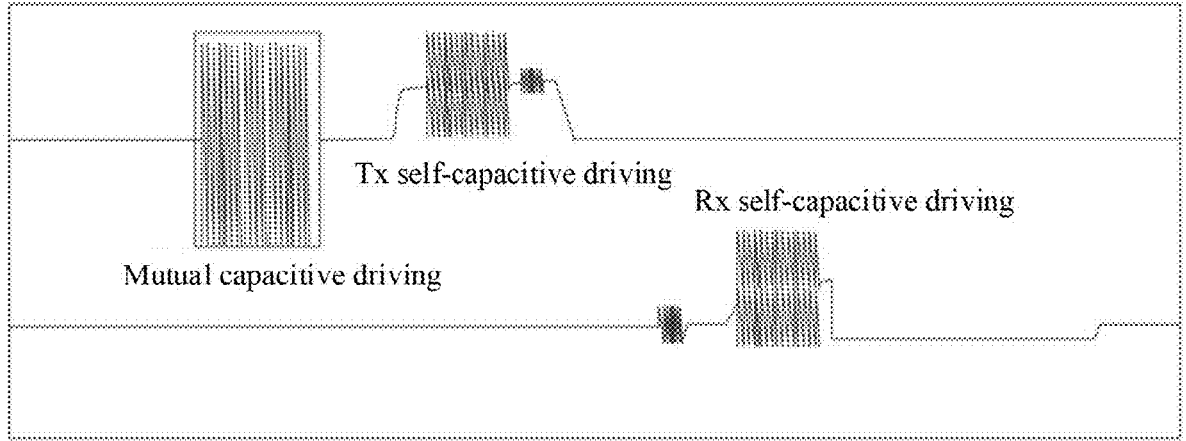
FIG. 12 is a timing diagram of mutual capacitive touch driving for periodically detecting a target touch substrate shown in FIG. 5*a;*

Referring to FIGS. 11 and 12, FIG. 11 is a timing diagram of a mutual capacitive touch drive circuit for periodically detecting the target touch substrate 100 shown in FIG. 5*a*, and FIG. 12 is a timing diagram of mutual capacitive touch driving for periodically detecting the target touch substrate 100 shown in FIG. 5*a*.

Referring to FIGS. 13*a* and 13*b*, they are circuit schematic diagrams for performing mutual capacitive touch detection on the target touch substrate described in FIG. 5. As shown in FIGS. 13*a* and 13*b*, taking the target touch substrate being the touch substrate C as an example, when mutual capacitive touch detection is performed on the target touch substrate 100, a connection path between the touch substrate D and the TIC is turned off, which may be performed according to the following stages:

a) first stage: in a Reset stage, LCTRL is turned on, GCTRL, HCTRL, and P1 are turned off, and the Tx PAD voltage is stabilized at LVDD (negative voltage) →at Rx PAD, RGCTRL' is turned on, P1' is turned off, Rx PAD is grounded, and the voltage is stabilized at 0V;

b) second stage: in a Tx driving stage, GCTRL is turned on, LCTRL, HCTRL, and P1 are turned off, and the Tx PAD voltage jumps to 0V→at Rx PAD, RGCTRL is turned off, the P1' is turned on, and the AFE receives a charge signal of Rx;

c) third stage: in a Tx driving phase, HCTRL is turned on, LCTRL, GCTRL, and P1 are turned off, and the Tx PAD voltage jumps to HVDD→at Rx PAD, RGCTRL is turned off, P1' is turned on, and AFE receives a charge signal of Rx;

d) fourth stage: in a Reset stage, HCTRL is turned on, LCTRL, GCTRL, and P1 are turned off, and the Tx PAD voltage is stabilized at HVDD (positive voltage);

e) fifth stage: in a Tx driving phase, GCTRL is turned on, LCTRL, HCTRL, and P1 are turned off, the Tx PAD voltage jumps to 0V→at Rx PAD, RGCTRL is turned off, P1' is turned on, and AFE receives a signal of Rx;

f) sixth stage: in a Tx driving phase, LCTRL is turned on, HCTRL, GCTRL, and P1 are turned off, and the Tx PAD voltage jumps to LVDD→at Rx PAD, RGCTRL is turned off, P1' is turned on, and AFE receives a signal of Rx;

g) seventh stage: in a Reset stage, LCTRL is turned on, GCTRL, HCTRL, and P1 are turned off, and the Tx PAD voltage is stabilized at LVDD (negative voltage);

the touch detection on one row of touch driving lines 1022 and one column of touch sensing lines 1021 is completed above; and h) . . . the above driving is repeated until the entire touch substrate 100 is scanned, and then the next round of touch detection is started again.

As shown in FIG. 13*b*, when touch detection is performed on the touch substrate D, the touch detection on the touch substrate D may refer to the touch detection on the touch substrate C and will not be described in detail here.

For the self-capacitive touch detection, sensing electrodes and drive electrodes are included. Thus, the self-capacitive touch detection may be performed based on the sensing electrodes, or the self-capacitive touch detection may be performed based on the drive electrodes.

In an example, as shown in FIG. 12, in a first sub-time period of the second time period, a drive signal may be provided to the touch driving line 1022 in the target touch substrate 100, and a touch position on the touch substrate 100 may be acquired based on a sensing signal fed back by the touch driving line 1022;

and/or in a second sub-time period of the second time period, a drive signal is provided to the touch sensing line 1021 in the target touch substrate 100, and a touch position on the touch substrate 100 is acquired based on a sensing signal fed back by the touch sensing line 1021.

The first sub-time period is different from the second sub-time period.

That is, the time period-divided self-capacitive driving may be performed based on the sensing electrodes and the drive electrodes. Referring to FIGS. 14*a*-15*b*, FIG. 14*a* is a schematic diagram of a drive circuit for performing self-capacitive touch detection on the drive electrode in a touch module shown in FIG. 5*a*, and FIG. 14*b* is a schematic diagram of a drive circuit for performing self-capacitive touch detection on the drive electrode in another touch module shown in FIG. 5*a*. FIG. 15*a* is a schematic diagram of a drive circuit for performing self-capacitive touch detection on the sensing electrode in a touch module shown in FIG. 5*a*, and FIG. 15*b* is a schematic diagram of a drive circuit for performing self-capacitive touch detection on the sensing electrode in another touch module shown in FIG. 5*a*.

As shown in FIGS. 14*a*-15*b*, the process may be as follow.

a) As shown in FIG. 14*a*, the self-capacitive driving on the touch substrate C may be performed based on the drive electrodes in the touch substrate C. A switch S1 on the touch driving line on the touch substrate D is turned off, and a switch S1' on the touch sensing line on the touch substrate D is turned off. A switch P1' on the touch sensing line on the touch substrate C is turned off, a switch P1 on the touch driving line on the touch substrate C is turned on, and the AFE directly performs self-capacitive scanning and sensing on the drive electrode on the touch substrate C.

b) As shown in FIG. 14*b*, the self-capacitive driving on the touch substrate D may be performed based on the drive electrodes in the touch substrate D. A switch P1 on the touch driving line on the touch substrate C is turned off, and a switch P1' on the touch sensing line on the touch substrate C is turned off. A switch S1' on the touch sensing line on the touch substrate D is turned off, a switch S1 on the touch driving line on the touch substrate D is turned on, and the AFE directly performs self-capacitive scanning and sensing on the drive electrode on the touch substrate D.

c) As shown in FIG. 15*a*, the self-capacitive driving on the touch substrate C may be performed based on the sensing electrodes in the touch substrate C. A switch S1 on the touch driving line on the touch substrate D is turned off, and a switch S1' on the touch sensing line on the touch substrate D is turned off. A switch P1' on the touch sensing line on the touch substrate C is turned on, a switch P1 on the touch driving line on the touch substrate C is turned off, and the AFE directly performs self-capacitive scanning and sensing on the sensing electrode on the touch substrate C.

d) As shown in FIG. 15*b*, the self-capacitive driving on the touch substrate D may be performed based on the sensing electrodes in the touch substrate D. A switch P1' on the touch sensing line on the touch substrate C is turned off, and a switch P1 on the touch driving line on the touch substrate C is turned off. A switch S1 on the touch driving line on the touch substrate D is turned off, and a switch S1' on the touch sensing line on the touch substrate D is turned on. The AFE directly performs self-capacitive scanning and sensing on the sensing electrode on the touch substrate D.

In practice, in order to reduce the power consumption of the touch driving module 200 for performing touch detection, in the self-capacitive touch detection, the self-capacitive touch detection may be performed only based on the sensing electrodes or only based on the drive electrodes.

In an optical example, in order to prevent a situation where the touch sensitivity of another touch substrate 100 decreases when switching from the target touch substrate 100 to another touch substrate 100, in a state where touch detection is performed on the target touch substrate 100, the another touch substrate 100 also needs to be refreshed at a low frequency (such as 1 HZ). That is, in a gap of the touch driving of the target touch substrate 100, touch driving may be performed on the another touch substrate 100 to obtain reference signals of sensing electrodes and drive electrodes on the another touch substrate 100.

Specifically, in a detection gap of performing periodic touch detection on the target touch substrate 100, touch scanning is performed on the third touch substrate 100 through the touch driving module 200 to obtain a reference sensing signal of a touch electrode 106 on the third touch substrate 100. The reference sensing signal is used for providing a reference signal when touch detection is performed on the third touch substrate 100.

The detection gap may refer to a time period between the completion of one touch detection on the entire touch substrate 100 and the next touch detection. The touch detection on the third touch substrate 100 may be performed in a manner of performing touch detection on the target touch substrate 100. Specifically, when touch detection is performed on the third touch substrate 100, a third switch P1' in a sensing circuit connected to the touch sensing line 1021 on the third touch substrate 100 in the touch driving module 200 is turned on at an instant so that the TIC 201 may receive a sensing signal transmitted by the touch sensing line 1021 on the third touch substrate 100.

The completion of one touch detection on the entire target touch substrate 100 may refer to: completing one mutual capacitive touch detection and one self-capacitive touch detection on the entire target touch substrate 100.

When touch detection is performed on the third touch substrate 100, since the third touch substrate 100 is not a touch surface, a touch electrode 106 (including a drive electrode and a sensing electrode) thereon will not be touched by a finger. Thus, a sensing signal obtained may represent a reference signal when the touch electrode 106 is not touched, and thus is compared with a signal when the touch electrode 106 is touched so that it may be determined whether the touch electrode 106 is touched based on a difference obtained by the comparison.

In an example, the touch detection performed on the third touch substrate 100 may be mutual capacitive touch detection. Alternatively, the touch detection may include mutual capacitive touch detection and self-capacitive touch detection. Of course, in the case where the touch detection performed on the third touch substrate 100 includes mutual capacitive touch detection and self-capacitive touch detection, the accuracy of the reference signal may be improved to provide a more accurate reference signal when the third touch substrate 100 provides a touch function, thereby improving the accuracy of determining the touch position.

It should be noted that the method embodiment is similar to the above-mentioned touch module and display device embodiments. Thus, the description is relatively simple, and relevant parts may refer to the touch module and display device embodiments.

Based on the same inventive concept, the present disclosure also provides an electronic apparatus, including a memory, a processor, and a computer program stored on the memory and operable on the processor. The processor when executed implements the touch driving method according to the embodiments of the present disclosure.

Embodiments of the present disclosure also provide a computer-readable storage medium storing a computer program for causing a processor to perform the touch driving method according to the embodiments of the present disclosure.

Finally, it should be noted that in this document, relational terms such as "first" and "second" are merely used to distinguish one entity or operation from another, without necessarily requiring or implying any actual relationship or order between these entities or operations. Moreover, the terms "include," "comprising," or any other variations thereof are intended to encompass non-exclusive inclusion, so that a process, method, product, or device that includes a series of elements not only includes those elements but also includes other elements not explicitly listed, or includes elements inherent to such a process, method, product, or device. Unless further restricted, elements limited by the phrase "including a . . . " do not preclude the existence of additional same elements in the process, method, product, or device that includes the said element.

The above provides a detailed introduction to a touch module, display device, and touch driving method provided by this disclosure. Concrete examples are used in this document to illustrate the principles and implementation methods of this disclosure. The descriptions of the embodiments are only for the purpose of aiding in the understanding of the methods and core ideas of this disclosure. At the same time, for ordinary technicians in this field, there will be changes in the specific implementation methods and application scope based on the ideas of this disclosure. In summary, the content of this specification should not be understood as a limitation to this disclosure.

Technicians in this field, after considering the specification and practicing the invention disclosed here, will easily think of other implementations of this disclosure. This disclosure is intended to cover any modifications, uses, or adaptive changes of this disclosure, which follow the general principles of this disclosure and include common knowledge or conventional technical means in this technical field that are not disclosed in this disclosure. The specification and examples are only considered exemplary, and the true scope and spirit of this disclosure are pointed out by the claims below.

It should be understood that this disclosure is not limited to the precise structures described and shown in the drawings above, and various modifications and changes can be made without departing from its scope. The scope of this disclosure is only limited by the claims appended hereto.

The terms "an embodiment," "embodiment," or "one or more embodiments" as used herein mean that the specific features, structures, or characteristics described in conjunction with the embodiment are included in at least one embodiment of this disclosure. Furthermore, please note that the examples of "in an embodiment" here do not necessarily refer to the same embodiment.

In the specification provided here, a large number of specific details are described. However, it is understood that the embodiments of this disclosure can be practiced without these specific details. In some instances, well-known methods, structures, and technologies are not detailed in order not to obscure the understanding of this specification.

In the claims, any reference numerals between parentheses should not be construed as limitations on the claims. The word "comprising" does not exclude the presence of elements or steps not listed in the claims. The word "a" or "an" before an element does not exclude the presence of multiple such elements. This disclosure can be implemented with hardware that includes several different elements and with a computer that is appropriately programmed. In claims that list several apparatuses, several of these apparatuses can be embodied by the same hardware item. The use of words such as first, second, and third does not indicate any order. These words can be interpreted as names.

Finally, it should be noted that the above examples are only used to illustrate the technical solution of this disclosure, not to limit it; although this disclosure has been described in detail with reference to the aforementioned examples, ordinary technicians in this field should understand that they can still modify the technical solutions recorded in the aforementioned examples or replace some technical features with equivalent substitutes; and these modifications or substitutions do not deviate from the essence and scope of the technical solutions of the embodiments of this disclosure.

The invention claimed is:

1. A touch module, comprising: a touch driving module and a plurality of touch substrates connected to the touch driving module, wherein different touch substrates are configured to provide touch functions for different display panels;

the touch driving module is configured to perform touch switching among the plurality of touch substrates, and the touch switching comprises: conducting a connection path between the touch driving module and a target touch substrate to perform touch detection on the target touch substrate, and turning off connection paths among the touch driving module and other touch substrates except the target touch substrate, wherein the target touch substrate is a touch substrate currently providing the touch function;

each touch substrate comprises a plurality of touch signal lines, and the touch driving module comprises a touch integrated circuit (TIC) and a plurality of integrated units connected to the TIC;

the plurality of touch signal lines on each touch substrate comprise touch sensing lines, each integrated unit comprises a second integrated unit, the second integrated unit is configured to integrate a plurality of touch sensing lines from different touch substrates, the second integrated unit comprises a plurality of sensing circuits connected in parallel, and each sensing circuit is configured to transmit a sensing signal on a touch sensing line on one of the plurality of touch substrates to the TIC;

each sensing circuit comprises: a first switch, a second switch, and a third switch, wherein each touch sensing line is connected to a first terminal of the first switch, a first terminal of the second switch, and a first terminal of the third switch; and a second terminal of the first switch is grounded, and second terminals of the second switch and the third switch are connected to the TIC; the second switch is configured to receive a positive voltage outputted by the TIC, and the third switch is configured to input the sensing signal on the touch sensing line to the TIC.

2. The touch module according to claim 1, wherein each integrated unit is configured to integrate touch signal lines from the plurality of touch substrates, wherein each integrated unit comprises a plurality of signal transmission circuits connected in parallel, and each signal transmission circuit is connected to a touch signal line on one of the plurality of touch substrates for transmitting a signal outputted by the TIC to the touch signal line and transmitting a signal inputted via the touch signal line to the TIC.

3. The touch module according to claim 2, wherein the plurality of touch signal lines on each touch substrate comprise touch driving lines extending along a first direction and touch sensing lines extending along a second direction, and the first direction intersects the second direction;

wherein each integrated unit comprises a first integrated unit; the first integrated unit is configured to integrate a plurality of touch driving lines from different touch substrates;

wherein the first integrated unit comprises a plurality of drive circuits connected in parallel, and each drive circuit is configured to transmit a drive signal outputted by the TIC to a touch driving line on one of the plurality of touch substrates.

4. The touch module according to claim 3, wherein each drive circuit comprises: a fourth switch, a fifth switch, a sixth switch, and a seventh switch, wherein each touch driving line is connected to a first terminal of the fourth switch, a first terminal of the fifth switch, a first terminal of the sixth switch, and a first terminal of the seventh switch;

second terminals of the fourth switch and the fifth switch are connected to a power signal terminal of the TIC, a second terminal of the sixth switch is grounded, and a second terminal of the seventh switch is connected to a drive signal output terminal of the TIC, wherein the fourth switch is configured to receive a positive voltage outputted by the power signal terminal, the fifth switch is configured to receive a negative voltage outputted by the power signal terminal, and the drive signal output terminal is configured to output the drive signal.

5. The touch module according to claim 4, wherein each drive circuit further comprises an anti-static unit; and each touch driving line is connected to the first terminal of the fourth switch, the first terminal of the fifth switch, and the first terminal of the sixth switch, and then is connected to the first terminal of the seventh switch after being connected in series to the anti-static unit.

6. The touch module according to claim 1, wherein the touch driving module and a first touch substrate are located in a same panel, and the touch module further comprises: a first flexible circuit board;

the first flexible circuit board is configured to connect a plurality of touch signal lines on a second touch substrate to the touch driving module, wherein the first touch substrate is any one of the plurality of touch substrates, and the second touch substrate is a touch substrate except the first touch substrate.

7. The touch module according to claim 1, wherein the touch driving module comprises a first binding area and a second binding area; each integrated unit is located in the first binding area or the second binding area.

8. The touch module according to claim 1, wherein the numbers of the plurality of touch signal lines in different touch substrates are the same or different, wherein the number of the plurality of integrated units is greater than or equal to the number of touch signal lines on a first touch substrate, and the first touch substrate is a touch substrate with the largest number of touch signal lines.

9. A display device, comprising the touch module according to claim 1 and a plurality of display panels corresponding to a plurality of touch substrates in the touch module, respectively, wherein each touch substrate provides a touch function for a corresponding display panel.

10. The display device according to claim 9, wherein the display device further comprises a main control module, and the main control module is connected to a touch driving module in the touch module, wherein the main control module is configured to determine a target touch substrate to be switched to, and send a touch switching signal for the target touch substrate to the touch driving module; and the touch driving module is configured to conduct a connection path between the touch driving module and the target touch substrate in response to the touch switching signal to perform touch detection on the target touch substrate.

11. The display device according to claim 10, wherein each touch substrate is configured into a corresponding display panel, and the display panel has two different panel states; the panel state is used for characterizing whether a display surface of the display panel faces an observation sight line; and the main control module is configured to detect the panel state of the display panel and determine the target touch substrate based on the panel state.

12. The display device according to claim 10, wherein each display panel further comprises a plurality of signal lines, and the plurality of signal lines comprise a signal line connecting a display driving module on the display panel and the main control module, and a signal line connecting the touch driving module and the main control module; the display device further comprises: a second flexible circuit board, wherein the second flexible circuit board is configured to transfer a plurality of signal lines in at least one first display panel to a second display panel; and a plurality of signal lines on the second display panel are connected to the main control module through a switching interface on the second display panel.

13. The display device according to claim 12, wherein the touch driving module in the touch module is located in the second display panel, wherein the second flexible circuit board is further configured to transfer a plurality of touch signal lines of a touch substrate corresponding to the at least one first display panel to the second display panel so as to connect the transferred plurality of touch signal lines to the touch driving module.

14. The display device according to claim 12, wherein the display panel comprises a display area and a non-display area, and the non-display area comprises a frame area close to at least one side of the display area; the touch driving module and the plurality of signal lines are located in the frame area, wherein a size of the frame area of the second display panel is greater than a size of the frame area of the first display panel.

15. The display device according to claim 9, wherein among the plurality of display panels, a third display panel is located on a non-display surface side of a fourth display panel, wherein the fourth display panel is a foldable panel; and the third display panel displays a picture when the fourth display panel is in a folded state, and the fourth display panel displays a picture when the fourth display panel is in an unfolded state.

16. A touch driving method, applied to the touch module according to claim 1 the method comprising:

determining a target touch substrate to be currently touch-driven;

cutting off a connection path between the touch driving module and a third touch substrate except the target touch substrate, and conducting a connection path between the touch driving module and the target touch substrate; and performing touch detection on the target touch substrate through the touch driving module.

17. The touch driving method according to claim 16, wherein the touch detection is periodic touch detection, and the method further comprises:

in a detection gap of performing periodic touch detection on the target touch substrate, performing touch scanning on the third touch substrate through the touch driving module to obtain a reference sensing signal of a touch electrode on the third touch substrate, wherein the reference sensing signal is used for providing a reference signal when touch detection is performed on the third touch substrate.

18. The touch driving method according to claim 16, wherein the target touch substrate comprises a plurality of touch driving lines and a plurality of touch sensing lines; the plurality of touch driving lines are connected in series to a plurality of drive electrodes arranged along a first direction, and the plurality of touch sensing lines are connected in series to a plurality of sensing electrodes arranged along a second direction; the first direction intersects the second direction; the performing touch detection on the target touch substrate through the touch driving module comprises:

in a first time period, performing mutual capacitive touch detection on the target touch substrate;

in a second time period, performing self-capacitive touch detection on the target touch substrate; and acquiring a touch signal based on the mutual capacitive touch detection and the self-capacitive touch detection, wherein the first time period and the second time period do not overlap.

19. The touch driving method according to claim 18, wherein the in a second time period, performing self-capacitive touch detection on the target touch substrate comprises:

in a first sub-time period of the second time period, providing drive signals to the plurality of touch driving lines in the target touch substrate, and acquiring a touch position on the target touch substrate based on sensing signals fed back by the plurality of touch driving lines; and/or in a second sub-time period of the second time period, providing drive signals to the plurality of touch sensing lines in the target touch substrate, and acquiring the touch position on the target touch substrate based on sensing signals fed back by the plurality of touch sensing lines, wherein the first sub-time period is different from the second sub-time period.

\* \* \* \* \*